(12) United States Patent  
Ishikawa et al.

(10) Patent No.: US 7,045,227 B2  
(45) Date of Patent: May 16, 2006

(54) MAGNETIC RECORDING MEDIUM

(75) Inventors: Tatsuo Ishikawa, Kanagawa (JP); Mikio Ohno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/804,145

(22) Filed: Mar. 19, 2004

(65) Prior Publication Data

US 2004/0191528 A1 Sep. 30, 2004

(30) Foreign Application Priority Data

Mar. 24, 2003 (JP) .......................... P.2003-080223

(51) Int. Cl.
*G11B 5/738* (2006.01)
(52) U.S. Cl. .................................. 428/840.1
(58) Field of Classification Search ................ 428/216, 428/323, 425.9, 694 BA, 694 BS, 840.1
See application file for complete search history.

(56) References Cited

U.S. PATENT DOCUMENTS

| 4,664,965 A | * | 5/1987 | Okita et al. .................. 428/143 |
| 4,789,583 A | * | 12/1988 | Akutsu ........................ 428/143 |
| 6,428,884 B1 | * | 8/2002 | Naoe et al. .................. 428/323 |
| 2003/0152806 A1 | * | 8/2003 | Murayama et al. ... 428/694 BU |

FOREIGN PATENT DOCUMENTS

JP          5-57647 B2      8/1993

* cited by examiner

*Primary Examiner*—Stevan A. Resan
(74) *Attorney, Agent, or Firm*—Sughrue Mion, PLLC

(57) ABSTRACT

A magnetic recording medium comprising: a nonmagnetic support; an undercoat layer containing a compound polymerizable by radiation exposure; and a magnetic layer containing ferromagnetic powder and a binder, in this order wherein the undercoat layer has a thickness of from 0.1 to 1 µm, the binder contains a polyurethane resin having a glass transition temperature of from 100 to 200° C., the magnetic layer has a thickness of from 20 to 150 nm, and an average particle size of the ferromagnetic powder is from 20 to 60 nm.

15 Claims, No Drawings

MAGNETIC RECORDING MEDIUM

FIELD OF THE INVENTION

The present invention relates to a coating type magnetic recording medium, in particular, relates to a magnetic recording medium capable of realizing the compatibility of a stable error rate and running durability in high density recording inexpensively.

BACKGROUND OF THE INVENTION

Magnetic recording media comprising a nonmagnetic support having provided thereon a magnetic layer containing ferromagnetic powder dispersed in a binder are widely used as recording tapes, video tapes and floppy discs (registered trademark). And these magnetic recording media are required to have high levels of characteristics, e.g., electromagnetic characteristics, running durability and running property. For instance, audio tapes for recording and reproducing music are required to have higher performances of reproducing original sounds. Further, video tapes are required to have excellent electromagnetic characteristics such as excellent reproduction of original images.

Ferromagnetic powders in a magnetic layer have been improved from γ-iron oxide to metallic magnetic substances to have excellent electromagnetic characteristics to cope with such requirements, and higher Hc and higher as have been achieved. In particular, metallization has been progressed in 8 mm video tapes and video tapes for image-recording in the broadcasting fields. Further, in recent years, digital recording and reproduction of image and music have been progressed, thereby the deterioration in the reproduction of original image and sound can be god rid of during the course of reproduction and cutting, and original image and sound can be reproduced faithfully. In the evaluation of the performance of a tape in digitization, the error rate (the error rate of signals) in reproduction is used, and a method of evaluating error rate by separating the error rate of system from the error rate of tape is supposed in Japanese Patent 2829972.

For maintaining a stable error rate in a high recording density medium, it is necessary to heighten SNR and lower PW50 (a half value width of pulse). For obtaining high SNR, (1) increasing output, and (2) lowering noise are thought. With respect to (1) increasing output, smoothing a magnetic layer is effective.

For smoothing a magnetic layer, using a support having a smooth surface generally results in the increase of costs. Accordingly, by using an inexpensive coarse support and shielding the surface pimples of the support with an undercoat layer containing a compound polymerizable by radiation exposure to thereby smooth the surface, the increase of the costs can be suppressed and the performance as a high recording density medium can be satisfied (refer to, e.g., JP-B-5-57647 (page 1) (the term "JP-B" as used herein means an "examined Japanese patent publication").).

With respect to (2) lowering noise, it is effective to use magnetic substances comprising fine particles.

On the other hand, for lowering PW50, controlling of the thickness of a magnetic layer (thinning of a layer) is effective.

SUMMARY OF THE INVENTION

However, there remains a problem that the film strength of a magnetic layer deteriorates and the running durability of a medium decreases due to the atomization of magnetic substance and thinning of a magnetic layer.

The present invention has been done to get over the above described prior art problems, and the object of the present invention is to provide a magnetic recording medium capable of realizing the compatibility of a stable error rate and running durability in high density recording inexpensively.

As a result of eager investigation to achieve the above object, the present inventors succeeded for the first time in obtaining a magnetic recording medium capable of realizing a stable error rate and running durability inexpensively by optimizing the thickness of an undercoat layer containing a compound polymerizable by radiation exposure, including a binder containing a polyurethane resin having a glass transition temperature of from 100 to 200° C. in a magnetic layer, and using ferromagnetic powder having a minute average particle size in a magnetic thin layer. Thus the present invention has been attained.

That is, the object of the present invention has been achieved by the following magnetic recording medium.

A magnetic recording medium comprising a nonmagnetic support having provided thereon an undercoat layer containing a compound polymerizable by radiation exposure, and a magnetic layer containing ferromagnetic powder and a binder provided on the undercoat layer, wherein the thickness of the undercoat layer is from 0.1 to 1 μm, the binder contained in the magnetic layer contains a polyurethane resin having a glass transition temperature of from 100 to 200° C., the thickness of the magnetic layer is from 20 to 150 nm, and the average particle size of the ferromagnetic powder is from 20 to 60 nm.

DETAILED DESCRIPTION OF THE INVENTION

The magnetic recording medium according to the present invention is described in detail below.

Undercoat Layer

In the magnetic recording medium according to the invention, an undercoat layer provided on a nonmagnetic support contains a compound polymerizable by radiation exposure.

The compound polymerizable by radiation exposure contained in an undercoat layer has a property of being polymerized or crosslinked and becomes a high molecular weight compound and hardened when energy by radiation is given. The compound is not subject to reaction unless energy is given. Accordingly, the viscosity of a coating solution containing the compound is stable unless the coating solution is exposed to radiation, and high film smoothness can be obtained. Further, since the reaction progresses instantaneously by high energy of radiation, high film strength can be obtained.

This is due to the fact that the compound is relatively low viscous, such as from several mPa·s to 200 mPa·s, and pimples on a support are shielded by the leveling effect after coating an undercoat layer and a smooth support is formed. It is thought that a magnetic layer excellent in smoothness of the film surface can be obtained by coating a magnetic coating solution on the undercoat layer, thus the present invention can provide a magnetic recording medium excellent in error rate stability. This effect is particularly conspicuous in a relatively thin magnetic layer thickness of, e.g., from 20 to 150 nm, and, of the smoothness of the film surface, for instance, minute pimples on the surface of a magnetic layer that are liable to cause noises in magnetic recording with an MR head which has been used with the tendency of high recording density can be reduced.

The compounds polymerizable by radiation exposure contained in the undercoat layer are not particularly restricted, and compounds disclosed in JP-A-60-133529 (the term "JP-A" as used herein means an "unexamined published Japanese patent application"), JP-A-61-13429, JP-A-60-150227, JP-B-5-57647, JP-A-57-40747 and JP-A-61-13430, the compound having an alicyclic structure and two or more radiation-curable functional groups in one molecule as disclosed in Japanese Patent Application No. 2001-334528, the compound having a cyclic ether skeleton and two or more radiation-curable functional groups in the molecule, or the compound having a cyclic structure and an ether group and two or more radiation-curable functional groups in the molecule as disclosed in Japanese Patent Application No. 2002-276088 are exemplified.

Of the above compounds, the compound having a cyclic ether skeleton and two or more radiation-curable functional groups in the molecule or the compound having a cyclic structure and an ether group and two or more radiation-curable functional groups in the molecule as disclosed in Japanese Patent Application No. 2002-276088 are preferred.

Since the compound having a cyclic ether skeleton and two or more radiation-curable functional groups in the molecule or the compound having a cyclic structure and an ether group and two or more radiation-curable functional groups in the molecule as disclosed in Japanese Patent Application No. 2002-276088 has a cyclic structure, these compounds have advantages that the elastic modulus of the undercoat layer can be improved and adhesion failure to rollers during the processes after undercoat layer coating does not occur as compared with aliphatic compounds conventionally used in an undercoat layer.

Further, these compounds have another advantage that adhesion of an undercoat layer to a support can be improved, since shrinkage by hardening can be reduced due to their cyclic structure. Accordingly, lowering of running durability such as the dropout of a magnetic layer can be inhibited.

In addition, it is thought that the high adhesion strength of an undercoat layer to a support in the present invention is also attributable to the fact that appropriate extensibility is given to the undercoat layer, since these compounds have an ether group.

It is also advantageous that a problem of shelf stability does not occur, e.g., hydrolysis, since these compounds do not contain an ester group.

These compounds can be obtained by the reaction of diol compounds having a cyclic ether structure or diol compounds having a cyclic structure and an ether group with acrylic acid or methacrylic acid.

As the diol compounds having a cyclic ether structure, e. g., diol compounds having structures such as tetrahydrofuran, tetrahydropyran, dioxane, dioxine, dioxene, and dioxolan can be used. As the specific examples of the diol compounds having a cyclic ether structure, e.g., tetrahydrofuran dimethanol, tetrahydropyran dimethanol, 1,3-dioxane-2-ethanol-5-ethyl-5-hydroxymethyl-β,β-dimethyl, 1,3-dioxolan-2-ethanol-5-ethyl-5-hydroxymethyl-β,β-dimethyl, and 3,9-bis(1,1-dimethyl-2-hydroxyethyl)-2,4,8–10-tetraoxaspiro(5,5)-undecane are exemplified.

As the diol compounds having a cyclic structure and an ether group, e.g., diol compounds obtained by polycondensation of diols having a cyclic structure such as a cyclohexane ring, bisphenol, bisphenol hydride, biphenyl, or biphenyl ether, and diol compounds obtained by adding ethylene oxide or propylene oxide to the above diols having a cyclic structure can be used. The specific examples of diols having a cyclic structure include bisphenol A, bisphenol A hydride, bisphenol S, bisphenol S hydride, bisphenol F, bisphenol F hydride, bisphenol P, bisphenol P hydride, diphenylbisphenol A, diphenylbisphenol S, diphenylbisphenol F, 5,5'-(1-methyl ethylidene)-bis(1,1'-bicyclohexyl)-2-ol, 4,4'-(1-methyl ethylidene)-bis-2-methylcyclohexanol, 5,5'-(1,1'-cyclohexylidene)-bis(1,1'-bicyclohexyl)-2-ol, and 5,5'-(1,1'-cyclohexylmethylene)-bis(1,1'-bicyclohexyl)-2-ol.

In the present invention, the addition number of ethylene oxide and/or propylene oxide of the compounds having a cyclic ether skeleton and two or more radiation-curable functional groups in the molecule, or the compounds having a cyclic structure and an ether group and two or more radiation-curable functional groups in the molecule is preferably from 2 to 6 mols in the molecule. When the addition number is 2 mols or more, good adhesion of an undercoat layer with a support can be obtained, and when the addition number is 6 mols or less, the elastic modulus of the obtained undercoat layer is high and adhesion failure hardly occurs in the coating process.

As the radiation-curable functional groups to be introduced into the compounds, an acryloyl group and a methacryloyl group are preferably used. Two or more radiation-curable functional groups are contained in the molecule, and it is particularly preferred that two radiation-curable functional groups be contained in the molecule.

The compounds preferably have a molecular weight of from 250 to 1,000, and more preferably from 250 to 500. In this range of the molecular weight, a magnetic recording medium having high leveling effect and high smoothness can be obtained.

As the compound having a cyclic ether skeleton and two or more radiation-curable functional groups in the molecule, a compound represented by B1-(A1)$_n$-X1-(A1')$_{n'}$-B1' (formula 1) can be used.

In formula 1, X1 represents

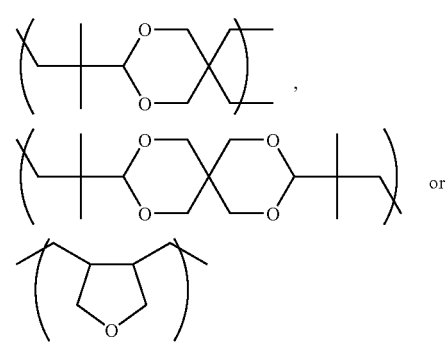

A1 represents

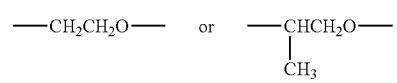

A1' represents

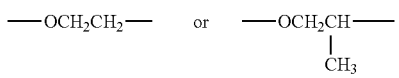

B1 represents

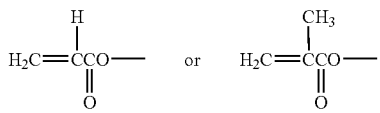

B1' represents

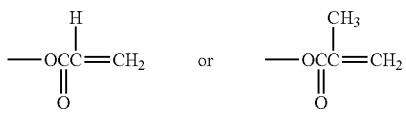

and n and n' each represents any of from 0 to 6, preferably any of from 0 to 4, and when n and n' are greater than 6, the elastic modulus of the undercoat layer lowers, and adhesion failure is liable to occur in the coating process.

The examples of the compounds represented by formula 1 include, e.g., tetrahydrofuran dimethanol diacrylate, tetrahydropyran dimethanol diacrylate, 3,9-bis(1,1-dimethyl-2-hydroxyethyl)-2,4,8,10-tetraoxaspiro-(5,5)-undecane diacrylate, 5-ethyl-2-(2-hydroxy-1,1'-dimethylethyl)-5-(hydroxymethyl)-1,3-dioxane diacrylate, tetrahydrofuran dimethanol dimethacrylate, tetrahydropyran dimethanol dimethacrylate, 3,9-bis(1,1-dimethyl-2-hydroxyethyl)-2,4,8,10-tetraoxaspiro-(5,5)-undecane dimethacrylate, 5-ethyl-2-(2-hydroxy-1,1'-dimethylethyl)-5-(hydroxymethyl)-1,3-dioxane dimethacrylate, and ethylene oxide adducts and propylene oxide adducts of these compounds. Of these compounds, 5-ethyl-2-(2-hydroxy-1,1'-dimethylethyl)-5-(hydroxymethyl)-1,3-dioxane diacrylate, tetrahydrofuran dimethanol diacrylate, and 3,9-bis(1,1-dimethyl-2-hydroxy ethyl)-2,4,8,10-tetraoxaspiro-(5,5)-undecane diacrylate are preferred.

As the compound having a cyclic structure and an ether group and two or more radiation-curable functional groups in the molecule, a compound represented by B2-(A2)$_m$-X2-(A2')$_{m'}$-B2' (formula 2) can be used.

In formula 2, X2 represents

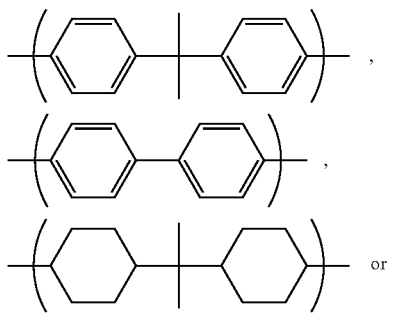

-continued

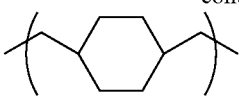

A2 represents

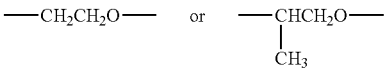

A2' represents

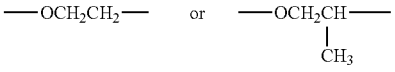

B2 represents

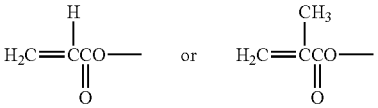

B2' represents

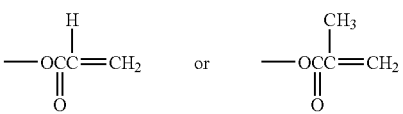

and m and m' each represents any of from 2 to 6, preferably any of from 2 to 4. When m and m' represent less than 2, the adhesion of the undercoat layer with a support is insufficient, and when greater than 6, the elastic modulus of the undercoat layer lowers and adhesion failure is liable to occur in the coating process.

The examples of the compounds represented by formula 2 include, e.g., cyclohexanedimethanol ethylene oxide adduct diacrylate, bisphenol A ethylene oxide adduct diacrylate, bisphenol A hydride ethylene oxide adduct diacrylate, hydroxybiphenyl ethylene oxide adduct diacrylate, bisphenol S ethylene oxide adduct diacrylate, bisphenol S hydride ethylene oxide adduct diacrylate, bisphenol F ethylene oxide adduct diacrylate, bisphenol F hydride ethylene oxide adduct diacrylate, bisphenol P ethylene oxide adduct diacrylate, bisphenol P hydride ethylene oxide adduct diacrylate, diphenyl bisphenol A ethylene oxide adduct diacrylate, diphenyl bisphenol S ethylene oxide adduct diacrylate, diphenyl bisphenol F ethylene oxide adduct diacrylate, 5,5'-(1-methylethylidene)bis(1,1'-bicyclohexyl)-2-ol ethylene oxide adduct diacrylate, 4,4'-(1-methylethylidene)bis-2-methyl cyclohexanol ethylene oxide adduct diacrylate, 5,5'-(1,1'-cyclohexylidene)bis(1,1'-bicyclohexyl)-2-ol ethylene oxide adduct diacrylate, 5,5'-(1,1'-cyclohexylmethylene)bis(1,1'-bicyclohexyl)-2-ol ethylene oxide adduct diacrylate, cyclohexanedimethanol propylene oxide adduct diacrylate, bisphenol A propylene oxide adduct diacrylate, bisphenol A hydride propylene oxide adduct diacrylate, hydroxybiphenyl propylene oxide adduct diacrylate, bisphenol S propylene oxide adduct diacrylate, bisphenol S hydride propylene oxide adduct diacrylate, bisphenol F propylene oxide adduct diacrylate, bisphenol F hydride propylene oxide adduct diacrylate, bisphenol P propylene oxide adduct diacrylate, bisphenol P hydride propylene oxide adduct diacrylate, diphenyl bisphenol A propylene oxide adduct diacrylate, diphenyl bisphenol S propylene oxide adduct diacrylate, diphenyl bisphenol F propylene oxide adduct diacrylate, 5,5'-(1-methyl ethylidene)bis(1,1'-bicyclohexyl)-2-ol propylene oxide adduct diacrylate, 4,4'-(1-methylethylidene)bis-2-methylcyclohexanol propylene oxide adduct diacrylate, 5,5'-(1,1'-cyclohexylidene)bis(1,1'-bicyclohexyl)-2-ol propylene oxid adduct diacrylate, 5,5'-(1,1'-cyclohexyl methylene)bis(1,1'-bicyclohexyl)-2-ol propylene oxide adduct diacrylate, cyclohexanedimethanol ethylene oxide adduct dimethacrylate, bisphenol A ethylene oxide adduct dimethacrylate, bisphenol A hydride ethylene oxide adduct dimethacrylate, hydroxybiphenyl ethylene oxide adduct dimethacrylate, bisphenol S ethylene oxide adduct dimethacrylate, bisphenol S hydride ethylene oxide adduct dimethacrylate, bisphenol F ethylene oxide adduct dimethacrylate, bisphenol F hydride ethylene oxide adduct dimethacrylate, bisphenol P ethylene oxide adduct dimethacrylate, bisphenol P hydride ethylene oxide adduct dimethacrylate, diphenyl bisphenol A ethylene oxide adduct dimethacrylate, diphenyl bisphenol S ethylene oxide adduct dimethacrylate, diphenyl bisphenol F ethylene oxide adduct dimethacrylate, 5,5'-(1-methylethylidene)bis(1,1'-bicyclo hexyl)-2-ol ethylene oxide adduct dimethacrylate, 4,4'-(1-methylethylidene)bis-2-methylcyclohexanol ethylene oxide adduct dimethacrylate, 5,5'-(1,1'-cyclohexylidene)bis(1,1'-bicyclohexyl)-2-ol ethylene oxide adduct dimethacrylate, 5,5'-(1,1'-cyclohexylmethylene)bis-(1,1'-bicyclohexyl)-2-ol ethylene oxide adduct dimethacrylate, cyclohexane dimethanol propylene oxide adduct dimethacrylate, bisphenol A propylene oxide adduct dimethacrylate, bisphenol A hydride propylene oxide adduct dimethacrylate, hydroxybiphenyl propylene oxide adduct dimethacrylate, bisphenol S propylene oxide adduct dimethacrylate, bisphenol S hydride propylene oxide adduct dimethacrylate, bisphenol F propylene oxide adduct dimethacrylate, bisphenol F hydride propylene oxide adduct dimethacrylate, bisphenol P propylene oxide adduct dimethacrylate, bisphenol P hydride propylene oxide adduct dimethacrylate, diphenyl bisphenol A propylene oxide adduct dimethacrylate, diphenyl bisphenol S propylene oxide adduct dimethacrylate, diphenyl bisphenol F propylene oxide adduct dimethacrylate, 5,5'-(1-methylethylidene)bis-(1,1'-bicyclo hexyl)-2-ol propylene oxide adduct dimethacrylate, 4,4'-(1-methylethylidene)bis-2-methylcyclohexanol propylene oxide adduct dimethacrylate, 5,5'-(1,1'-cyclohexylidene)bis-(1,1'-bicyclohexyl)-2-ol propylene oxide adduct dimethacrylate, and 5,5'-(1,1'-cyclohexylmethylene)bis-(1,1'-bicyclohexyl)-2-ol propylene oxide adduct dimethacrylate. Of these compounds, cyclohexanedimethanol ethylene oxide adduct diacrylate, bisphenol A ethylene oxide adduct diacrylate, bisphenol A hydride ethylene oxide adduct diacrylate, and hydroxybiphenyl ethylene oxide adduct diacrylate are preferred.

The compound represented by formula 1 or 2 can be obtained by the reaction of a diol compound having a cyclic ether or a diol compound having a cyclic structure and an ether group with an acrylic acid or a methacrylic acid. The substituents introduced to both terminals are preferably acryloyl groups.

Besides the above compounds, mono-functional acrylate and methacrylate compounds can be used as reactive diluents in the undercoat layer in the present invention. Reactive diluents have functions to adjust physical properties and hardening reaction of an undercoat layer-coating solution. Preferred reactive diluents are acrylate compounds having an alicyclic hydrocarbon skeleton. As the specific examples of the reactive diluents, cyclohexyl (meth)acrylate, isobonyl (meth)acrylate, and tetrahydrofurfuryl (meth)acrylate can be exemplified. The blending amount of the reactive diluent is preferably from 10 to 100 mass parts per 100 mass parts of the above compound.

An undercoat layer-coating solution containing the above compound may be dissolved in a solvent, if necessary. The viscosity of an undercoat layer-coating solution is preferably from 5 to 200 mPa·s at 25° C., and more preferably from 5 to 100 mPa·s. When the viscosity is within the above range, the pimples on the support are shielded by the leveling effect after coating the undercoat layer and a smooth magnetic layer can be obtained. As the solvents, methyl ethyl ketone (MEK), methanol, ethanol and toluene are preferably used.

An undercoat layer-coating solution is coated on a support, dried, irradiated with radiation and hardened. The glass transition temperature Tg of the undercoat layer after being hardened is preferably from 80 to 150° C., more preferably from 100 to 130° C. When Tg is 80° C. or more, adhesion failure does not occur in the coating process, and when 150° C. or less, film strength can be heightened and preferred.

The thickness of an undercoat layer is preferably from 0.1 to 1.0 μm, more preferably from 0.3 to 0.8 μm. When the thickness is 0.1 μm or more, sufficient smoothness can be obtained, and when 1.0 μm or less, the film easily dries and adhesion failure does not occur.

An undercoat layer coated on the later-described support is dried and exposed to radiation, thus the aforementioned compound polymerizable by radiation exposure is hardened.

As the radiation, electron beams and ultraviolet rays can be used in the present invention. When ultraviolet rays are used, it is necessary to add a photopolymerization initiator to the above compound. When electron beams are used for hardening, a polymerization initiator is not necessary and the penetration depth of electron beams is deep and preferred.

A scanning system, a double scanning system and a curtain beam system can be used as electron beam accelerators. A curtain beam system is preferred, since high output can be obtained relatively inexpensively. As electron beam characteristics, accelerating voltage is preferably from 30 to 1,000 kV, more preferably from 50 to 300 kV, and absorbed dose is preferably from 0.5 to 20 Mrad, and more preferably from 2 to 10 Mrad. When the accelerating voltage is 30 kV or higher, a sufficient amount of energy permeation can be obtained, and when 1,000 kV or less, the efficacy of energy for use in polymerization is high, so that economical. The atmosphere of electron beam irradiation is preferably oxygen concentration of 200 ppm or less by purging nitrogen. If oxygen concentration is high, crosslinking and curing reaction near the surface is hindered.

As the light sources for ultraviolet irradiation, mercury lamps can be used. Mercury lamps having a capacity of from 20 to 240 W/cm can be used at a velocity of from 0.3 to 20 m/min. The distance between a mercury lamp and a substrate is generally preferably from 1 to 30 cm.

Photo-radical polymerization initiators can be used as the photopolymerization initiators for ultraviolet curing. The details are described, e.g., in *Shin-Kobunshi Jikken-Gaku, Hikari Hoshasen Jugo* (*New Polymer Experiments, Photo-*

*Radiation Polymerization*), Chap. 6, Vol. 2, compiled by Polymer Society, published by Kyoritsu Publishing Co., Ltd. (1995). As the specific examples of photopolymerization initiators, acetophenone, benzophenone, anthraquinone, benzoin ethyl ether, benzyl methyl ketal, benzyl ethyl ketal, benzoin isobutyl ketone, hydroxydimethyl phenyl ketone, 1-hydroxy-cyclohexyl phenyl ketone, and 2,2-diethoxyacetophenone are exemplified. The blending ratio of aromatic ketones is preferably from 0.5 to 20 mass parts per 100 mass parts of radiation-curable compounds, more preferably from 2 to 15 mass parts, and still more preferably from 3 to 10 mass parts.

Well-known radiation curing apparatus and conditions can be used, and *UV·EB Koka Gijutsu* (*UV and EB Curing Techniques*), published by Sogo Gijutsu Center Co., Ltd., and *Tei Energy Denshi-Sen Shosha no Oyo Gijutsu* (*Applied Techniques of Low Energy Electron Beam Irradiation*), published by CMC Publishing Co., Ltd. (2000) can be referred to.

In the magnetic recording medium in the present invention, the number of pimples having heights of from 10 to 20 nm measured with an atomic force microscope (AFM) can be controlled to 5 to 1,000 per 100 $\mu m^2$ of the later-described magnetic layer surface by providing the undercoat layer.

The height measured with an atomic force microscope (AFM) is defined as the height with the central plane (a plane where the volume enclosed by the plane and the roughness curve of a magnetic layer surface is equal and smallest on the upper and lower sides of the plane) obtained with an atomic force microscope as the datum plane.

Accordingly, the number of pimples (hereinafter also referred to as "PN") having heights of from 10 to 20 nm per 100 $\mu m_2$ of a magnetic layer surface is the number of pimples per 10 $\mu m$ square in total having the heights higher than the datum plane by 10 to 20 nm which means pimple density. PN is more preferably from 5 to 100/100 $\mu m^2$. When PN is 5 or more, the friction coefficient is low, and when 1,000 or less, high output can be ensured and the number of dropout (DO) is liable to lower.

The magnetic recording medium in the present invention is manufactured by forming the undercoat layer, then a non-magnetic lower layer or a magnetic lower layer on the undercoat layer and a magnetic layer thereon, or directly forming a magnetic layer on the undercoat layer. The undercoat layer is provided at least on one side of the support, or maybe provided on both sides. The nonmagnetic layer, the magnetic lower layer, or the magnetic layer is formed by coating a composition comprising nonmagnetic powder or magnetic powder dispersed in a binder on the undercoat layer.

Magnetic Layer

<Polyurethane Resin Having Tg of from 100 to 200° C.>

The binder at least contained in a magnetic layer of the magnetic recording medium according to the invention contains a polyurethane resin having Tg of from 100 to 200° C.

When a binder containing a polyurethane resin having high Tg is used at least in a magnetic layer, plastic flow of the magnetic layer due to the frictional heat caused by the slide of recording and reproducing heads with the magnetic layer surface is suppressed, and good film strength can be obtained, thus excellent running durability can be attained. The effect is particularly conspicuous in the case where the magnetic layer is a thin layer. Further, when the binder containing a polyurethane resin is used in the later-described nonmagnetic layer, high film strength can be obtained, and scraping of tape edge due to the sliding with a regulating guide can be preferably inhibited when the tape is run in a drive.

Tg of the polyurethane resin contained in a binder in the present invention is from 100 to 200° C., and preferably from 120 to 170° C. When Tg is 100° C. or higher, good running durability can be obtained without reducing the film strength. When Tg is 200° C. or less, a smoothing effect by calendering treatment can be obtained, so that good electromagnetic characteristics and running durability can be obtained.

The polyurethane resin contains urethane groups in concentration of preferably from 2.5 to 6.0 mmol/g, and more preferably from 3.0 to 4.5 mmol/g. When the urethane group concentration is 2.5 mmol/g or more, the film has high Tg, thus good durability can be obtained. While when the concentration is 6.0 mmol/g or less, solubility in a solvent is high, thus good dispersibility can be ensured. When the urethane group concentration is excessively high, the polyurethane resin cannot contain polyol inevitably, as a result the control of molecular weight is difficult, which is not preferred from the point of synthesis.

The polyurethane resins have a weight average molecular weight (Mw) of preferably from 30,000 to 200,000, and more preferably from 50,000 to 100,000. When the weight average molecular weight is 30,000 or more, high film strength and good running durability can be obtained, and when it is lower than 200,000, high solubility in a solvent and good dispersibility can be obtained.

As the polar groups of the polyurethane resins, —$SO_3M$, —$OSO_3M$, —$PO_3M_2$ and —COOM are preferred, and —$SO_3M$ and —$OSO_3M$ (wherein M represents a hydrogen atom, alkali metal or ammonium) are more preferred. The content of polar groups is preferably from $1 \times 10^{-5}$ to $2 \times 10^{-4}$ eq/g. When the content of polar groups is $1 \times 10^{-5}$ eq/g or more, the adhesion of the polyurethane resin onto ferromagnetic powder and nonmagnetic powder is heightened and good dispersibility can be obtained. While when the content is $2 \times 10^{-4}$ eq/g or less, high solubility in a solvent and good dispersibility can be secured.

The content of OH groups in the polyurethane resin is preferably from 2 to 20 per a molecule, and more preferably from 3 to 15 per a molecule. When 2 or more OH groups are contained per a molecule, the polyurethane resin well reacts with an isocyanate hardening agent, so that high film strength and good durability can be obtained. On the other hand, when the polyurethane resin contains 15 or less OH groups per a molecule, solubility in a solvent becomes high and good dispersibility can be secured. For introducing OH groups, compounds having trifunctional or higher OH groups, e.g., trimethylolethane, trimethylolpropane, trimellitic anhydride, glycerol, pentaerythritol or hexanetriol, branched polyester or polyether ester having trifunctional or higher OH groups can be used. Trifunctional OH groups are preferred of these compounds. Tetrafunctional or higher groups expedite the reaction with a hardening agent, as a result the pot life becomes short.

Well-known polyols can be used in the present invention as the polyol components of the polyurethane resin contained in the binder, e.g., polyester polyol, polyether polyol, polycarbonate polyol, polyether ester polyol, polyolefin polyol, and diol compounds having a cyclic structure and a long alkyl chain, such as dimer diol, can be used.

The molecular weight of these polyols is preferably from 500 to 2,000 or so. When the molecular weight is in the above range, it is possible to substantially increase the weight ratio of diisocyanate, as a result urethane bonds increase and the intermolecular interaction is heightened, so that a film having a high glass transition temperature and high dynamic strength can be obtained.

The diol components are preferably diol compounds having a cyclic structure and a long alkyl chain. A long alkyl chain means an alkyl group having from 2 to 18 carbon atoms. When the compound has a cyclic structure and a long alkyl chain, the compound comes to have a folded structure, and so the solubility in a solvent becomes excellent. As a result, the molecular chain of urethane adsorbed on to the surface of magnetic powder or nonmagnetic powder in a coating solution can be broadened, thereby dispersion stability can be improved and excellent electromagnetic characteristics (SNR) can be obtained. In addition, polyurethane having a high glass transition temperature can be obtained for having the cyclic structure.

Diol compounds having a cyclic structure and a long alkyl chain are particularly preferably represented by the following formulae:

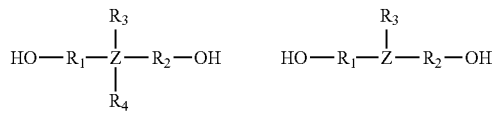

In the formulae, Z represents a cyclic structure selected from a cyclohexane ring, a benzene ring and a naphthalene ring; $R_1$ and $R_2$ each represents an alkylene group having from 1 to 18 carbon atoms; and $R_3$ and $R_4$ each represents an alkyl group having from 2 to 18 carbon atoms.

The above diol components are preferably contained in the polyurethane resin in an amount of from 10 to 50 wt %, and more preferably from 15 to 40 wt %. When the content of the diol components is 10 wt % or more, solubility in a solvent is high and good dispersibility can be obtained, and when the content is 50 wt % or less, a film having high Tg and excellent durability can be obtained.

The polyurethane resin can contain a diol component other than the above diol components as a chain extender. When the molecular weight of the diol components becomes great, the content of diisocyanate inevitably becomes small, so that the urethane bonds in the polyurethane lessen and the film strength deteriorates. Consequently, for obtaining satisfactory film strength, the chain extender to be used in combination with the polyurethane resin is preferably low molecular weight diol having a molecular weight of less than 500, preferably 300 or less.

The specific examples of chain extenders include aliphatic glycols, e.g., ethylene glycol, 1,3-propanediol, propylene glycol, neopentyl glycol (NPG), 1,4-butanediol, 1,5-pentanediol, 1,6-hexanediol, 1,8-octanediol, 1,9-nonane-diol, 2,2-dimethyl-1,3-propanediol, 2-ethyl-2-butyl-1,3-propanediol, and 2,2-diethyl-1,3-propanediol, alicyclic glycols, e.g., cyclohexanedimethanol (CHDM), cyclohexanediol (CHD), and bisphenol A hydride (H-BPA), ethylene oxide adducts and propylene oxide adducts of these alicyclic glycols, aromatic glycols, e.g., bisphenol A (BPA), bisphenol S, bisphenol P and bisphenol F, and), ethylene oxide adducts and propylene oxide adducts of these aromatic glycols. A particularly preferred chain extender is bisphenol A hydride.

As the diisocyanates for use in the polyurethane resin, well-known diisocyanates, e.g., TDI (tolylene diisocyanate), MDI (diphenylmethane diisocyanate), p-phenylene diisocyanate, o-phenylene diisocyanate, m-phenylene diisocyanate, xylylene diisocyanate, xylylene diisocyanate hydride, and isophorone diisocyanate are preferably used.

In the present invention, the polyurethane resin may be used in combination with vinyl chloride synthetic resins. The vinyl chloride resins which can be used in combination have the polymerization degree of preferably from 200 to 600, and particularly preferably from 250 to 450. The vinyl chloride resins may be copolymers of vinyl monomers, e.g., vinyl acetate, vinyl alcohol, vinylidene chloride or acrylonitrile.

The polyurethane resin may be used in combination with various synthetic resins besides these vinyl chloride resins. As such usable synthetic resins, e.g., ethylene-vinyl acetate copolymers, cellulose derivatives, e.g., nitrocellulose resins, acrylic resins, polyvinyl acetal resins, polyvinyl butyral resins, epoxy resins and phenoxy resins are exemplified. These synthetic resins may be used alone or in combination.

When the polyurethane resin and the synthetic resins are used in combination in a magnetic layer, the polyurethane resin is contained in the binder in an amount of preferably from 10 to 90 mass %, more preferably from 20 to 80 mass %, and still more preferably from 25 to 60 mass %. The amount of the vinyl chloride resins contained in the binder is preferably from 10 to 80mass %, more preferably from20 to 70 mass %, and particularly preferably from 30 to 60 mass %.

Further, a hardening agent, e.g., polyisocyanate compounds, can be used with the binder in the present invention. As the examples of polyisocyanate compounds, the reaction products of 3 mols of tolylene diisocyanate and 1 mol of trimethylolpropane (e.g., Desmodur L-75, manufactured by Bayer Yakuhin Ltd.), the reaction products of 3 mols of diisocyanate, e.g., xylylene diisocyanate or hexamethylene diisocyanate and 1 mol of trimethylolpropane, biuret addition compounds with 3 mols of hexamethylene diisocyanate, isocyanurate compounds of 5 mols of tolylene diisocyanate, isocyanurate addition compounds of 3 mols of tolylene diisocyanate and 2 mols of hexamethylene diisocyanate, and polymers of isophorone diisocyanate and diphenylmethane diisocyanate can be exemplified.

The amount of the polyisocyanate compounds contained in a magnetic layer is preferably from 10 to 50 mass %, and more preferably from 20 to 40 mass %. When a magnetic layer is subjected to hardening treatment with electron beam irradiation, compounds having a reactive double bond, e.g., urethane acrylate, can be used. The total weight of the resin components and the hardening agent (i.e., the weight of the binder) is generally preferably from 15 to 40 weight parts per 100 weight parts of the ferromagnetic powder, and more preferably from 20 to 30 weight parts.

<Ferromagnetic Powder>

In the present invention, the average particle size of ferromagnetic powders for use in a magnetic layer is from 20 to 60 nm. For the purpose of obtaining a stable error rate, ferromagnetic powders having a minute average particle size are used in the present invention, e.g., higher SNR can be obtained with an average particle size of from 20 to 60 nm, preferably from 20 to 50 nm, and more preferably from 20 to 45 nm.

Ferromagnetic powders for use in a magnetic layer in the invention are not especially restricted so long as they have an average particle size of from 20 to 60 nm. As ferromagnetic powders that can be used in the invention, e.g. ferromagnetic metal powders having an average long axis length of from 20 to 60 nm, and hexagonal ferrite ferromagnetic powders having an average tabular diameter of from 20 to 60 nm are exemplified.

Ferromagnetic Metal Powder

Ferromagnetic metal powders used in a magnetic layer in the present invention are preferably cobalt-containing ferromagnetic iron oxides or ferromagnetic alloy powders having a specific surface area $S_{BET}$ of from 40 to 80 m$^2$/g, preferably from 50 to 70 m$^2$/g. These ferromagnetic metal powders have a crystallite size of from 12 to 25 nm, preferably from 13 to 22 nm, and particularly preferably from 14 to 20 nm. The average long axis length of the ferromagnetic powders is from 20 to 60 nm, preferably from 20 to 50 nm, and particularly preferably from 20 to 45 nm. As the ferromagnetic powders, Fe, Fe—Co, Fe—Ni, and Co—Ni—Fe each containing yttrium are exemplified. The yttrium content in the ferromagnetic powders is preferably from 0.5 to 20 atomic %, and more preferably from 5 to 10 atomic %, in the atomic ratio of the yttrium atom to the iron atom, Y/Fe. When the yttrium content is 0.5 atomic % or more, high saturation magnetization ($\sigma_s$) of the ferromagnetic powder becomes possible, thus magnetic characteristics are improved and good electromagnetic characteristics can be obtained. While when the yttrium content is 20 atomic % or less, the iron content is appropriate and good magnetic characteristics and improved electromagnetic characteristics can be obtained. Further, the ferromagnetic metal powders can contain aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium or bismuth within the range of 20 atomic % or less to 100 atomic % of iron. In addition, the ferromagnetic metal powders may contain a small amount of water, hydroxide or oxide.

An example of manufacturing methods of the ferromagnetic powder usable in the invention to which cobalt and yttrium are introduced is described below. A method of using, as a starting material, iron oxyhydroxide obtained by blowing oxidizing gas to a water suspension comprising the mixture of ferrous salt and alkali can be exemplified. As the kind of the iron oxyhydroxide, α-FeOOH is preferred. As the manufacturing method of α-FeOOH, there are a first method of neutralizing ferrous salt with alkali hydroxide to make a water suspension of Fe (OH)$_2$, and blowing oxidizing gas to the suspension to thereby obtain acicular α-FeOOH, and a second method of neutralizing ferrous salt with alkali carbonate to make a water suspension of FeCO$_3$, and blowing oxidizing gas to the suspension to thereby obtain. spindle-like α-FeOOH. These iron oxyhydroxides are preferably those obtained by reacting an aqueous solution of ferrous salt with an alkali aqueous solution to thereby obtain an aqueous solution containing ferrous hydroxide, and oxidizing the solution by air oxidation and the like. At this time, a salt of alkaline earth elements, e.g., Ni salt, Ca salt, Ba salt or Sr salt, or Cr salt or Zn salt may be coexistent with the ferrous salt aqueous solution. The figures of particles of ferromagnetic powders (axial ratio) can be adjusted by arbitrarily selecting and using these salts.

As the ferrous salts, ferrous chloride and ferrous sulfate are preferably used. As the alkalis, sodium hydroxide, aqueous ammonia, ammonium carbonate and sodium carbonate are preferably used. As the salts that can be coexistent with the ferrous salts, chlorides, e.g., nickel chloride, calcium chloride, barium chloride, strontium chloride, chromium chloride and zinc chloride are preferably used. In the case where cobalt is introduced into the iron, an aqueous solution of cobalt compound, e.g., cobalt sulfate or cobalt chloride, is mixed with the slurry of the iron oxyhydroxide and stirred before introducing yttrium. After preparing the slurry of cobalt-containing iron oxyhydroxide, an aqueous solution containing an yttrium compound is added to the slurry and mixed with stirring, thereby cobalt can be introduced.

Neodymium, samarium, praseodymium and lanthanum can also be introduced into the ferromagnetic powder of the present invention besides yttrium. These elements can be introduced into the ferromagnetic powder by using chlorides, e.g., yttrium chloride, neodymium chloride, samarium chloride, praseodymium chloride and lanthanum chloride, and nitrates, e.g., neodymium nitrate and gadolinium nitrate, and these elements may be used in combination of two or more. The figures of the ferromagnetic powders are not especially restricted but acicular, granular, die-like, ellipsoidal and tabular figures are generally used. Acicular ferromagnetic powders are particularly preferably used.

A magnetic coating solution is prepared by kneading and dispersing the resin component, hardening agent and ferromagnetic powder with a solvent usually used in the preparation of a magnetic coating solution, e.g., methyl ethyl ketone, dioxane, cyclohexanone or ethyl acetate. Kneading and dispersion can be performed according to ordinary methods. Besides the above components, a magnetic coating solution may contain usually used additives or fillers, such as an abrasive, e.g., α-Al$_2$O$_3$ and Cr$_2$O$_3$, an antistatic agent, e.g., carbon black, a lubricant, e.g., fatty acid, fatty acid ester and silicone oil, and a dispersant.

(Hexagonal Ferrite Ferromagnetic Powder)

As the hexagonal ferrites contained in a magnetic layer in the present invention, e.g., substitution products and co-substitution products of barium ferrite, strontium ferrite, lead ferrite and calcium ferrite can be exemplified. Specifically, magnetoplumbite type barium ferrite and strontium ferrite, magnetoplumbite type ferrite having covered the particle surfaces with spinel, and magnetoplumbite type barium ferrite and strontium ferrite partially containing spinel phase are exemplified. Hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Hexagonal ferrite powders containing Co—Zn, Co—Ti, Co—Ti—Zr, Co—Ti—Zn, Ni—Ti—Zn, Nb—Zn—Co, Sb—Zn—Co and Nb—Zn elements can be generally used. According to starting materials and manufacturing methods, specific impurities may be contained.

The average tabular diameter of the hexagonal ferrite powders usable in the invention is generally from 20 to 60 nm, preferably from 20 to 50 nm, and particularly preferably from 20 to 35 nm, although it varies according to recording density. The tabular diameter here means the longest hexagonal diameter of the base of the hexagonal pole of the hexagonal ferrite magnetic powder, and the average tabular diameter is the arithmetic mean of it. When reproduction is performed with a magneto-resistance head particularly for increasing track density, it is necessary to reduce noise, consequently the tabular diameter is preferably 35 nm or less but when the tabular diameter is in the range of from 20 to 60 nm, stable magnetization not influenced by thermal fluctuation can be obtained and noise can be suppressed, thus the tabular diameter of the above range is preferred for high density magnetic recording. The tabular ratio (tabular diameter/tabular thickness) is preferably from 1 to 15, and more preferably from 1 to 7. When the tabular ratio is 1 or more, sufficient orientation can be attained while maintaining high packing density in a magnetic layer. When the tabular ratio is 15 or less, the influence by stacking among particles can be almost got rid of and noise does not increase.

The specific surface area measured by the BET method of the particles having the diameters in the above range is preferably from 30 to 200 $m^2/g$. The specific surface area nearly coincides with the value obtained by the arithmetic operation from the tabular diameter and the tabular thickness of a particle. The distribution of tabular diameter·tabular thickness is generally preferably as narrow as possible. It is difficult to show the distributions in numerical values but the distributions can be compared by measuring 500 particles selected randomly from TEM photographs. The distributions are in many cases not regular distributions, but when expressed in the standard deviation to the average size by calculation, σ/average size is from 0.1 to 2.0. For obtaining narrow particle size distribution, it is efficient to make a particle-forming reaction system homogeneous as far as possible, and subject particles formed to distribution-improving treatment as well. For instance, a method of selectively dissolving superfine particles in an acid solution is also known.

The coercive force (Hc) measured in hexagonal ferrite ferromagnetic powders is not particularly restricted, but Hc of the range of from 119 to 239 kA/m (1,500 to 3,000 Oe) or so is preferred. Higher coercive force (Hc) is advantageous for high density recording but Hc is restricted by the capacity of recording head. Coercive force (Hc) can be controlled by the particle size (tabular diameter·tabular thickness), the kinds and amounts of the elements contained in the hexagonal ferrite powder, the substitution sites of the elements, and the particle-forming reaction conditions. The saturation magnetization ($\sigma_s$) of hexagonal ferrite ferromagnetic powders is generally from 30 to 80 $A·m^2/kg$, and preferably from 40 to 70 $A·m^2/kg$. Saturation magnetization has the inclination of becoming smaller as particles become finer. For improving saturation magnetization, a method of reducing the temperature of crystallization or heat treatment temperature and time, a method of increasing the amount of the compound to be added, and a method of increasing the surface treatment amount may be used in manufacturing. W-type hexagonal ferrite can also be used. In dispersing magnetic powders, the particle surfaces of magnetic powders may be treated with substances compatible with the dispersion media and the polymers.

Inorganic and organic compounds are used as surface-treating agents. For example, oxides and hydroxides of Si, Al and P, various kinds of silane coupling agents and various kinds of titanium coupling agents are primarily used. The addition amount of these surface-treating agents is from 0.1 to 10% of the amount of the magnetic powder. The pH of magnetic powders is also important for dispersion, and it is generally from 4 to 12 or so. The optimal value of pH is dependent upon the dispersion medium and the polymer. Taking the chemical stability and storage stability of the medium into consideration, pH of from 6 to 11 or so is selected. The water content in magnetic powders also affects dispersion. The optimal value of the water content is dependent upon the dispersion medium and the polymer, and the water content of from 0.01 to 2.0% is selected in general.

The manufacturing methods of hexagonal ferrites include the following methods and any of these methods can be used in the invention with no restriction: (1) a glass crystallization method comprising the steps of mixing barium oxide, iron oxide, metallic oxide which substitutes iron, and boron oxide as a glass-forming material so as to make a desired ferrite composition, melting and then quenching the ferrite composition to obtain an amorphous product, treating by reheating, washing and pulverizing the amorphous product, to thereby-obtain barium ferrite crystal powder; (2) a hydrothermal reaction method comprising the steps of neutralizing a solution of barium ferrite composition metallic salts with an alkali, removing the byproducts produced, heating the liquid phase at 100° C. or more, washing, drying and then pulverizing, to thereby obtain barium ferrite crystal powder; and (3) a coprecipitation method comprising the steps of neutralizing a solution of barium ferrite composition metallic salt with an alkali, removing the byproducts produced and drying, treating the system at 1,100° C. or less, and then pulverizing to obtain barium ferrite crystal powder.

<Thickness and Coercive Force (Hc) of Magnetic Layer>

In the present invention, the thickness of a magnetic layer is from 20 to 150 nm, preferably from 20 to 100 nm, and more preferably from 20 to 50 nm.

When the thickness of a magnetic layer is 150 nm or less, a PW50 value (a half value width of pulse) can be lowered and a stable error rate can be obtained in high density recording and preferred. Further, a high SNR can be obtained, so that a stable error rate can be obtained.

In the present invention, the value of coercive force (Hc) in the machine direction or in-plane direction of a magnetic layer is not particularly restricted, but for decreasing self-demagnetization loss and achieving high density recording, the coercive force is preferably from 159 to 239 kA/m (from 2,000 to 3,000 Oe). When the coercive force (Hc) is 159 kA/m or more, good high density recording can be achieved. On the other hand, the higher the coercive force (Hc), the higher is the SNR at high density recording, but too high a coercive force (Hc) value results in the reduction of erasure ratio. Accordingly, it is preferred in the present invention to restrict the upper limit of Hc in the machine direction or in-plane direction of a magnetic layer to 239 kA/m. The coercive force (Hc) is preferably from 175 to 207 kA/m (from 2,200 to 2,600 Oe), and more preferably from 183 to 199 kA/m (from 2,300 to 2,500 Oe).

In the specification of the invention, "the machine direction of a magnetic layer" is the direction that is coincides with the running direction of a tape-like magnetic recording medium, i.e., the direction perpendicular to the transverse direction. Further, in the specification of the invention, "the in-plane direction of a magnetic layer" means the direction formed by the running direction and the transverse direction in a disc-like magnetic recording medium. [0088]

In the present invention, for realizing the above coercive force (Hc) in the machine direction or in-plane direction of a magnetic layer, it is preferred to use, e.g., ferromagnetic fine powder having an average particle size of from 20 to 60 nm, saturation magnetization ($\sigma_s$) of from 110 to 155 $A·m^2/kg$ and coercive force (Hc) of 159 kA/m or more.

The additives which can be used in the invention in a magnetic layer with the above binders and ferromagnetic powders are described below.

<Carbon Black>

The examples of carbon blacks used in the invention in a magnetic layer include furnace blacks for rubbers, thermal blacks for rubbers, carbon blacks for coloring and acetylene blacks. These carbon blacks preferably have a specific surface area of from 5 to 500 $m^2/g$, a DBP oil absorption amount of from 10 to 400 ml/100 g, an average particle size of from 5 to 300 nm, pH of from 2 to 10, a water content of from 0.1 to 10%, and a tap density of from 0.1 to 1 g/ml. The specific examples of carbon blacks are disclosed in WO 98/35345.

Carbon blacks can serve various functions such as the prevention of the static charge and the reduction of the friction coefficient of a magnetic layer, the provision of a light-shielding property to a magnetic layer, and the improvement of the film strength of a magnetic layer. These functions vary dependent on the kinds of carbon blacks to be used. Accordingly, in the case where the magnetic recording medium of the present invention takes a multilayer structure, it is of course possible to select and determine the kinds, the amounts and the combinations of carbon blacks to be added to each layer on the basis of the above-described various properties, such as particle sizes, oil absorption amounts, electrical conductances and pH values, or these should be rather optimized in respective layers.

<Abrasive>

Abrasives can be contained in a magnetic layer in the present invention. As the abrasives usable in the invention, well-known materials essentially having a Mohs' hardness of 6 or more may be used alone or in combination, e.g., α-alumina having an α-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. The composites composed of these abrasives (abrasives obtained by surface-treating with other abrasives) may also be used.

Compounds or elements other than the main component are often contained in abrasives in the present invention, but the intended effect can be obtained so long as the content of the main component is 90% or more. It is preferred for these abrasives to have an average particle size of 0.01 to 2 μm, and abrasives having narrow particle size distribution are preferably used particularly to improve electromagnetic characteristics (SNR). For the purpose of improving durability, a plurality of abrasives respectively having different particle sizes may be combined according to necessity, or a single abrasive having broad particle size distribution may be used so as to attain the same effect as such a combination.

The abrasives preferably have a tap density of from 0.3 to 2 g/ml, a water content of from 0.1 to 5%, pH of from 2 to 11, and a specific surface area of from 1 to 30 m$^2$/g. The figure of the abrasives for use in the invention may be any of acicular, spherical and die-like figures. Abrasives having a figure partly with edges are preferred for their high abrasive property. The specific examples of abrasives for use in the invention are disclosed in WO 98/35345, and, above all, using diamonds as disclosed in the same patent is effective for improving running durability and electromagnetic characteristics. The particle sizes and addition amounts of abrasives to be added to a magnetic layer should be selected at optimal values.

<Other Additives>

As other additives which can be added to a magnetic layer in the present invention, those having a lubricating effect, an antistatic effect, a dispersing effect and a plasticizing effect are exemplified, and comprehensive improvement of performances can be contrived by combining these additives. As additives having a lubricating effect, lubricants showing a remarkable action on agglutination caused by the friction of surfaces of materials with each other are used. Lubricants are classified to two types. Lubricants used in a magnetic recording medium cannot be judged completely whether they show fluid lubrication or boundary lubrication, but according to general concepts they are classified into higher fatty acid esters, liquid paraffin and silicon derivatives which show fluid lubrication, and long chain fatty acids, fluorine surfactants and fluorine-containing polymers which show boundary lubrication. In a coating type magnetic recording medium, lubricants exist in a state of being dispersed in a binder or in a state of partly being adsorbed onto the surfaces of ferromagnetic powder, and they migrate to the surface of a magnetic layer. The speed of migration depends upon whether the compatibility of the binder and the lubricant is good or bad. The speed of migration is slow when the compatibility of the binder and the lubricant is good and the migration speed is fast when the compatibility is bad. As one idea as to good or bad of the compatibility, there is a means of comparison of the dissolution parameters of the binder and the lubricant. A nonpolar lubricant is effective for fluid lubrication and a polar lubricant is effective for boundary lubrication.

In the present invention, it is preferred to use a higher fatty acid ester showing fluid lubrication and a long chain fatty acid showing boundary lubrication respectively having different characteristics in combination, and it is more preferred to combine at least three kinds of lubricants. Solid lubricants can also be used in combination with these lubricants.

As the solid lubricants, molybdenum disulfide, tungsten graphite disulfide, boron nitride, and graphite fluoride are used in the present invention. The examples of long chain fatty acids showing boundary lubrication include monobasic fatty acids having from 10 to 24 carbon atoms (which may contain an unsaturated bond or may be branched), and metal salts of these monobasic fatty acids (e.g., with Li, Na, K and Cu). The examples of fluorine surfactants and fluorine-containing polymers include fluorine-containing silicones, fluorine-alcohols, fluorine-containing esters, fluorine-containing alkyl sulfuric esters, and alkali metal salts of them. The examples of higher fatty acid esters showing fluid lubrication include fatty acid monoesters, fatty acid diesters and fatty acid triesters comprising a monobasic fatty acid having from 10 to 24 carbon atoms (which may contain an unsaturated bond or may be branched) and any one of monohydric, dihydric, trihydric, tetrahydric, pentahydric and hexahydric alcohols having from 2 to 12 carbon atoms (which may contain an unsaturated bond or may be branched), and fatty acid ester of monoalkyl ethers of alkylene oxide polymers. In addition to the above, the examples further include liquid paraffin, and as the silicon derivatives, silicone oils, e.g., dialkyl-polysiloxane (wherein the alkyl group has from 1 to 5 carbon atoms), dialkoxy-polysiloxane (wherein the alkoxyl group has from 1 to 4 carbon atoms), monoalkylmonoalkoxypolysiloxane (wherein the alkyl group has from 1 to 5 carbon atoms and alkoxyl group has from 1 to 4 carbon atoms), phenylpolysiloxane, and fluoroalkylpolysiloxane (wherein the alkyl group has from 1 to 5 carbon atoms), silicones having a polar group, fatty acid-modified silicones, and fluorine-containing silicones.

The examples of other lubricants usable in the present invention include alcohols such as monohydric, dihydric, trihydric, tetrahydric, pentahydric, and hexahydric alcohols having from 2 to 12 carbon atoms (which may contain an unsaturated bond or may be branched), alkoxy alcohols having from 12 to 22 carbon atoms (which may contain an unsaturated bond or may be branched), and fluorine-containing alcohols, polyethylene waxes, polyolefins such as polypropylenes, ethylene glycols, polyglycols such as polyethylene oxide waxes, alkyl phosphoric esters and alkali metal salts of alkyl phosphoric esters, alkyl sulfuric esters and alkali metal salts of alkyl sulfuric esters, polyphenyl ethers, fatty acid amides having from 8 to 22 carbon atoms, and aliphatic amines having from 8 to 22 carbon atoms.

The examples of additives having an antistatic effect, a dispersing effect and a plasticizing effect which can be used in the invention include phenylphosphonic acids, specifically "PPA" (manufactured by Nissan Chemical Industries, Ltd.), α-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfuric esters and alkali metal salts thereof.

The lubricants particularly preferably used in the invention are fatty acids and fatty acid esters, and the specific examples of the lubricants are disclosed in WO 98/35345. Besides the above compounds, other different lubricants and additives can be used in combination as well.

Additionally, nonionic surfactants, e.g., alkylene oxides, glycerols, glycidols and alkylphenol-ethylene oxide adducts; cationic surfactants, e.g., cyclic amines, ester amides, quaternary ammonium salts, hydantoin derivatives, heterocyclic rings, phosphoniums and sulfoniums; anionic surfactants containing an acidic group, e.g., a carboxylic acid, a sulfonic acid, a phosphoric acid, a sulfuric ester group and a phosphoric ester group; and amphoteric surfactants, e.g., amino acids, aminosulfonic acids, sulfuric esters or phosphoric esters of amino alcohols, and alkylbetaines can also be used.

The details of these surfactants are described in *Kaimen Kasseizai Binran* (*Handbook of Surfactants*) (published by Sangyo Tosho Co., Ltd.). These lubricants and antistatic agents need not be 100% pure and may contain impurities such as isomers, unreacted products, byproducts, decomposed products and oxides, in addition to the main components. However, the content of such impurities is preferably 30% or less, and more preferably 10% or less.

It is also preferred to use a monoester and a diester in combination as fatty acid esters as disclosed in WO 98/35345.

The amount of the lubricants contained in a magnetic layer according to the present invention is preferably from 5 to 30 mass parts per 100 mass parts of the ferromagnetic powder.

The lubricants and surfactants that are used in the invention respectively have differentphysical functions. The kind, amount and proportion of generating synergistic effects of the lubricants should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point and a different polarity so as to prevent bleeding out of the esters to the surface. It is also effective to adjust the amount of the surfactant so as to improve the coating stability, or to make the amount of the lubricant in an intermediate layer larger so as to improve the lubricating effect. Examples are by no means limited thereto. The total amount of the lubricants is generally from 0.1 to 50 mass parts per 100 mass parts of the magnetic powder or the nonmagnetic powder, and preferably from 2 to 25 mass parts.

All or a part of the additives to be used in the invention may be added to a magnetic coating solution or a nonmagnetic coating solution in any step of preparation. For instance, the additives may be blended with the magnetic powder before a kneading step, may be added in the step of kneading magnetic powder, a binder and a solvent, may be added in a dispersing step, may be added after dispersion, or may be added just before coating. According to the purpose, there is a case of capable of attaining the object by coating all or a part of the additives simultaneously with or successively after the coating of a magnetic layer. According to the purpose, the lubricants may be coated on the surface of a magnetic layer after calendering treatment or after the completion of slitting.

Nonmagnetic Layer

The magnetic recording medium in the invention can have a nonmagnetic layer as the lower layer of the above magnetic layer. The nonmagnetic layer is described in detail below.

The nonmagnetic layer in the invention exhibits its effect so long as it is substantially nonmagnetic, and even if, or intentionally, a small amount of magnetic powder is contained as the impurity, it reveals the effect of the invention, and as a matter of course the nonmagnetic layer can be regarded as essentially the same constitution as in the present invention.

The term "substantially nonmagnetic" means that the residual magnetic flux density of the nonmagnetic layer is 10 T·m or less or the coercive force (Hc) is 8 kA/m (100 Oe) or less, preferably the residual magnetic flux density and the coercive force are zero. When the nonmagnetic layer contains magnetic powder, the content of the magnetic powder is preferably less than ½ of the entire inorganic powders in the nonmagnetic layer. Further, a soft magnetic layer comprising soft magnetic powder and a binder may be formed as the lower layer in place of the nonmagnetic layer. The thickness of the soft magnetic layer is the same as the case of the nonmagnetic layer.

The nonmagnetic layer in the invention preferably comprises nonmagnetic inorganic powder and a binder as the main components. The nonmagnetic inorganic powders used in the nonmagnetic layer can be selected from inorganic compounds, e.g., metallic oxide, metallic carbonate, metallic sulfate, metallic nitride, metallic carbide and metallic sulfide. The inorganic compounds are selected from the following compounds and they can be used alone or in combination, e.g., α-alumina having an α-conversion rate of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. Of these compounds, titanium dioxide, zinc oxide, iron oxide and barium sulfate are particularly preferred for the reasons that they have narrow particle size distribution and a variety of means for imparting functions, and titanium dioxide and α-iron oxide are more preferred.

The nonmagnetic inorganic powders preferably have an average particle size of from 5 to 200 nm. If necessary, a plurality of nonmagnetic inorganic powders each having a different average particle size may be combined, or single nonmagnetic inorganic powder having a broad particle size distribution may be used so as to attain the same effect as such a combination. The particularly preferred average particle size of the nonmagnetic inorganic powders is from 10 to 200 nm. In particular, when the nonmagnetic inorganic powders are granular metallic oxides, the average particle size is preferably 80 nm or less, and when nonmagnetic inorganic powder are acicular metallic oxides, the average long axis length is preferably 300 nm or less, and more preferably 200 nm or less.

The nonmagnetic inorganic powders have a tap density of generally from 0.05 to 2 g/ml, and preferably from 0.2 to 1.5 g/ml; a water content of generally from 0.1 to 5 mass %, preferably from 0.2 to 3 mass %, and more preferably from 0.3 to 1.5 mass %; a pH value of generally from 2 to 11, and particularly preferably from 5.5 to 10; a specific surface area of generally from 1 to 100 m$^2$/g, preferably from 5 to 80 m$^2$/g, and more preferably from 10 to 70 m$^2$/g; a crystallite size of preferably from 0.004 to 1 μm, and more preferably from 0.04 to 0.1 μm; a DBP (dibutyl phthalate) oil absorption amount of generally from 5 to 100 ml/100 g, preferably from 10 to 80 ml/100 g, and more preferably from 20 to 60 ml/100 g; and a specific gravity of generally from 1 to 12, and preferably from 3 to 6. The nonmagnetic inorganic powders may have any figure, e.g., acicular, spherical, polyhedral and tabular figures. The nonmagnetic inorganic powders preferably have a Mohs' hardness of from 4 to 10. The SA (stearic acid) adsorption amount of the nonmagnetic inorganic powders is generally from 1 to 20 μmol/m$^2$, preferably from 2 to 15 μmol/m$^2$, and more preferably from 3 to 8 μmol/m$^2$. The pH value is preferably between 3 and 6.

The surfaces of these nonmagnetic inorganic powders are preferably covered with $Al_2O_3$, $SiO_2$, $TiO_2$, $ZrO_2$, $SnO_2$, $Sb_2O_3$, $ZnO$ or $Y_2O_3$ by surface treatment. $Al_3O_3$, $SiO_2$, $TiO_2$ and $ZrO_2$ are particularly preferred in the point of dispersibility, and $Al_2O_3$, $SiO_2$ and $ZrO_2$ are more preferred. These surface-covering agents may be used in combination or may be used alone. A surface-treated layer subjected to coprecipitation treatment may be used according to the purpose, alternatively surface treatment of particles may be performed to be covered with alumina in the first place, and then the alumina-covered surface may be covered with silica, or vice versa. Further, a surface-covered layer may be porous, if necessary, but a homogeneous and dense surface is generally preferred.

The specific examples of the nonmagnetic inorganic powders used in the lower layer and the manufacturing method of the nonmagnetic inorganic powders are disclosed in WO 98/35345.

Organic powders can be used in the nonmagnetic layer of the invention according to the purpose, e.g., acrylic styrene resin powders, benzoguanamine resin powders, melamine resin powders, and phthalocyanine pigments can be used. In addition, polyolefin resin powders, polyester resin powders, polyamide resin powders, polyimide resin powders and polyethylene fluoride resin powders can also be used. The producing methods of these powders are disclosed in JP-A-62-18564 and JP-A-60-255827.

The binders, lubricants, dispersants, additives, solvents, dispersing methods, the addition amounts and the like used in the magnetic layer shown above can be applied to the nonmagnetic layer. In particular, with respect to the amounts and kinds of binders, additives, and the addition amounts and kinds of dispersants, well-known techniques regarding the magnetic layer can be applied to the nonmagnetic layer in the present invention.

Nonmagnetic Support

A support for use in the invention is preferably a nonmagnetic flexible support, and essentially has a thermal shrinkage factor at 100° C. for 30 minutes of 3% or less in every direction of in-plane of the support, more preferably 1.5% or less, and a thermal shrinkage factor at 80° C. for 30 minutes of 1% or less, and more preferably 0.5% or less. Moreover, the above thermal shrinkage factors of the support at 100° C. for 30 minutes and at 80° C. for 30 minutes are preferably equal in every direction of in-plane of the support with difference of not more than 10%. The support is preferably a nonmagnetic support.

As the support for use in the present invention, well-known films, such as polyesters (e.g., polyethylene terephthalate and polyethylene naphthalate), polyolefins, cellulose triacetate, polycarbonate, aromatic or aliphatic polyamide, polyimide, polyamideimide, polysulfone, poly-aramid, and polybenzoxazole can be used. Supports having high strength such as polyethylene naphthalate and polyamide are especially preferably used. If necessary, a lamination type support as disclosed in JP-A-3-224127 can be used to control the surface roughness of a magnetic surface and a base surface respectively. These supports may be previously subjected to surface treatments, such as corona discharge treatment, plasma treatment, adhesion assisting treatment, heat treatment, and dust-removing treatment. Aluminum or glass substrate can also be used as the support in the invention.

It is preferred in the invention to use supports having a central plane average surface roughness (Ra) of 4.0 nm or less measured by model HD-2000 (a product of WYKO Co.), Ra is more preferably 2.0 nm or less. It is preferred that these supports not only have a small central plane average surface roughness but also are free from coarse pimples having a height of 0.5 μm or more. Surface roughness configuration is freely controlled by the size and amount of the fillers added to the support. The examples of fillers include acryl-based organic powders, as well as oxides or carbonates of Ca, Si and Ti. Supports for use in the invention preferably have a maximum height (Rmax) of 1 μm or less, a ten point average roughness (Rz) of 0.5 μm or less, a central plane peak height (Rp) of 0.5 μm or less, a central plane valley depth (Rv) of 0.5 μm or less, a central plane area factor (Sr) of from 10% to 90%, and an average wavelength (λa) of from 5 to 300 μm. The distribution of pimples on the surface of a support can be controlled arbitrarily by adding fillers to the support for the purpose of obtaining desired electromagnetic characteristics and durability. It is possible to add from 0 to 2,000 fillers having sizes of from 0.01 to 1 μm per 0.1 mm$^2$.

The F-5 value of a support for use in the invention is preferably from 49 to 490 MPa (from 5 to 50 kg/mm$^2$). A support for use in the invention has a breaking strength of from 49 to 980 MPa (from 5 to 100 kg/mm$^2$), an elastic modulus of from 980 to 19,600 (from 100 to 2,000 kg/mm$^2$), a temperature expansion coefficient of from $10^{-4}$ to $10^{-8}$/°C., preferably from $10^{-5}$ to $10^{-6}$/°C., and a humidity expansion coefficient of $10^{-4}$/RH % or less, preferably $10^{-5}$/RH % or less. The thermal characteristics, dimensional characteristics and mechanical strength are preferably almost equal in every direction of in-plane of a support with difference of not more than 10%.

Back Coat Layer

In a magnetic recording medium in the invention, if necessary, a back coat layer may be formed on the side of the support opposite to the side having a magnetic layer. A back coat layer can be formed on a magnetic disc as well. In general, however, a magnetic tape for a computer data recording is decidedly required to have an excellent repeating-running property as compared with the video tape and the audio tape. For maintaining such high running durability, it is preferred for a back coat layer to contain a carbon black and inorganic powder.

Two kinds of carbon blacks respectively having different average particle sizes are preferably used in combination in a back coat layer. In such a case, it is preferred to use a fine carbon black having an average particle size of from 10 to 20 nm and a coarse carbon black having an average particle size of from 230 to 300 nm in combination. In general, by the addition of a fine carbon black as above, the surface electrical resistance of a back coat layer and light transmittance can be set up at low values respectively. Since there are many kinds of magnetic recording apparatus making use of light transmittance of a tape to make it as a signal of operation, the addition of fine carbon blacks is particularly effective in such a case. In addition, a fine carbon black is in general excellent in retention of a liquid lubricant and contributes to the reduction of a friction coefficient when lubricants are used in combination. On the other hand, a coarse carbon black having an average particle size of from 230 to 300 nm has a function as a solid lubricant and forms minute pimples on the surface of a back coat layer to thereby reduce the contact area and contributes to the reduction of a friction coefficient.

The specific examples of commercially available fine carbon blacks and coarse carbon blacks used in a back coat layer in the invention are disclosed in WO 98/35345.

When two kinds of carbon blacks respectively having different average particle sizes are used in combination in a back coat layer, the proportion of the contents (by mass) of a fine carbon black having a particle size of from 10 to 20 nm and a coarse carbon black having a particle size of from 230 to 300 nm is preferably the former/the latter of from 98/2 to 75/25, and more preferably from 95/5 to 85/15.

The content of a carbon black in a back coat layer (the total amount when two kinds of carbon blacks are used) is generally from 30 to 80 mass parts per 100 mass parts of the binder, and preferably from 45 to 65 mass parts.

It is preferred to use two kinds of inorganic powders each having different hardness in a back coat layer. Specifically, soft inorganic powder having a Mohs' hardness of from 3 to 4.5 and hard inorganic powder having a Mohs' hardness of from 5 to 9 are preferably used in combination. By using soft inorganic powder having a Mohs' hardness of from 3 to 4.5, a friction coefficient can be stabilized against repeating running. Moreover, a sliding guide pole is not scratched off due to the hardness in this range. The average particle size of the soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more.

The content of the soft inorganic powders in a back coat layer is preferably from 10 to 140 mass parts based on 100 mass parts of the carbon black, and more preferably from 35 to 100 mass parts.

By the addition of hard inorganic powders having a Mohs' hardness of from 5 to 9, the strength of the back coat layer increases and running durability is improved. When such hard inorganic powders are used together with carbon blacks and the soft inorganic powders, deterioration due to repeating sliding is reduced and a strong back coat layer can be obtained. An appropriate abrasive property is provided to a back coat layer by the addition of the hard inorganic powder and the adhesion of scratched powders to a tape guide pole is reduced. In particular, when hard inorganic powder is used in combination with soft inorganic powder, sliding characteristics against a guide pole having a rough surface is improved and the stabilization of a friction coefficient of the back coat layer can also be brought about.

The average particle size of hard inorganic powders is preferably from 80 to 250 nm, and more preferably from 100 to 210 nm.

The examples of hard inorganic powders having a Mohs' hardness of from 5 to 9 include, e.g., $\alpha$-iron oxide, $\alpha$-alumina, and chromium oxide ($Cr_2O_3$). These powders may be used alone or in combination. Of the above hard inorganic powders, $\alpha$-iron oxide and $\alpha$-alumina are preferred. The content of hard inorganic powders in a back coat layer is generally from 3 to 30 mass parts per 100 mass parts of the carbon black, and preferably from 3 to 20 mass parts.

When the above soft inorganic powders and hard inorganic powders are used in combination in a back coat layer, it is preferred to use them selectively such that the difference of hardness between soft and hard inorganic powders is 2 or more, more preferably 2.5 or more, and particularly preferably 3 or more.

It is preferred that the above two kinds of inorganic powders respectively having different Mohs' hardness and specific average particle sizes and the above two kinds of carbon blacks respectively having different average particle sizes be contained in a back coat layer.

Lubricants may be contained in a back coat layer. The lubricants can be arbitrarily selected from among those usable in a magnetic layer or a nonmagnetic layer as described above. The content of a lubricant added to a back coat layer is generally from 1 to 5 mass parts per 100 mass parts of the binder.

The binders, lubricants, dispersants, additives, solvents, dispersing methods, the addition amounts and the like used in the magnetic layer and nonmagnetic layer shown above can be applied to aback coat layer. In particular, with respect to the amounts and kinds of binders, additives, and the addition amounts and kinds of dispersants, well-known techniques regarding the magnetic layer can be applied to a back coat layer in the present invention.

The magnetic recording medium in the invention can be used in a magnetic recording and reproducing system of reproducing the signals recorded on a magnetic recording medium with an MR head. The MR head used for the reproduction is not especially restricted, and, for instance, a GMR head and a TMR head can also be used. The amount of saturation magnetization of the head used in magnetic recording is not especially restricted, and the amount is 1.0 T or more, and preferably 1.5 T or more.

Layer Constitution

The thickness of the nonmagnetic support of the magnetic recording medium in the present invention is generally from 2 to 100 μm, and preferably from 2 to 80 μm. The thickness of the nonmagnetic support of a computer tape is from 3.0 to 6.5 μm, preferably from 3.0 to 6.0 μm, and more preferably from 4.0 to 5.5 μm.

The thickness of an undercoat layer is from 0.1 to 1.0 μm, and preferably from 0.3 to 0.8 μm. When a back coat layer is provided, the thickness of the back coat layer is from 0.2 to 1.0 μm, and preferably from 0.3 to 0.7 μm.

The thicknesses of a nonmagnetic layer and a magnetic layer of the magnetic recording medium of the invention are optimized according to the saturation magnetization amount and the head gap length of the heads to be used, and the recording signal zone. As described above, the thickness of a magnetic layer in the present invention is from 20 to 150 nm, preferably from 20 to 100 nm, and more preferably from 20 to 50 nm, and the thickness of a nonmagnetic layer is generally from 1.0 to 3.0 μm, preferably from 1.0 to 2.5 μm, and more preferably from 1.0 to 1.5 μm.

When the magnetic recording medium in the present invention comprises two magnetic layers, a nonmagnetic layer and a soft magnetic layer may be or may not be formed and, for example, the thickness of the magnetic layer farther from the support can be form 0.01 to 0.1 μm, preferably from 0.01 to 0.05 μm, and the thickness of the magnetic layer nearer from the support can be from 0.05 to 0. 15 μm. When a magnetic layer comprises a single layer, the thickness of the magnetic layer is from 20 to 150 nm as described above.

Manufacturing Method

Processes of preparing a magnetic layer coating solution for use in the magnetic recording medium in the present invention comprises at least a kneading step, a dispersing step and blending steps to be carried out optionally before and/or after the kneading and dispersing steps. Each of these steps may be composed of two or more separate stages. All the materials such as magnetic powder, nonmagnetic powder, a radiation-curable resin, a binder, a carbon black, an abrasive, an antistatic agent, a lubricant and a solvent for use in the magnetic recording medium in the present invention may be added in any step at any time, or each material maybe added in two or more steps separately. For instance, polyurethane can be added in parts in a kneading step, a dispersing step, or a blending step for adjusting viscosity after dispersion.

For achieving the object of the present invention, the above steps can be performed partly with conventionally well-known producing techniques. It is preferred to use powerful kneading machines such as an open kneader, a continuous kneader, a pressure kneader or an extruder in a kneading step. When a kneader is used, all or a part of magnetic powder or nonmagnetic powder and a binder (preferably 30% or more of the total binder) are kneading-treated in the range of from 15 to 500 mass parts per 100 mass parts of the magnetic powder. Details of kneading treatment are disclosed in JP-A-1-106338 and JP-A-1-79274. When a magnetic layer coating solution and a nonmagnetic layer coating solution are dispersed, glass beads can be used, but dispersing media having a high specific gravity, e.g., zirconia beads, titania beads and steel beads are preferably used. Optical particle sizes and packing densities of these dispersing media should be selected. Well-known dispersing apparatus can be used in the invention.

A nonmagnetic layer coating solution and a magnetic layer coating solution may be coated successively or may be multilayer-coated at the same time. When a magnetic layer comprises two layers, the upper magnetic layer and the lower magnetic layer may be coated successively or may be multilayer-coated simultaneously. It is preferred to form a nonmagnetic layer and a magnetic layer by a wet-on-dry coating method, that is, a nonmagnetic layer coating solution containing non-magnetic powder and a binder is coated on a nonmagnetic support and dried to form a nonmagnetic layer, and then a magnetic layer coating solution containing magnetic powder and a binder is coated on the nonmagnetic layer and dried to form a magnetic layer.

Air doctor coating, blade coating, rod coating, extrusion coating, air knife coating, squeeze coating, impregnation coating, reverse roll coating, transfer roll coating, gravure coating, kiss coating, cast coating, spray coating and spin coating can be used for coating the above magnetic layer coating solution or nonmagnetic layer coating solution. These coating methods are described, e.g., in Saishin Coating Gijutsu (The Latest Coating Techniques), Sogo Gijutsu Center Co. (May 31, 1983).

The following methods are preferably used in the present invention for coating a multilayer magnetic recording medium.

(1) A method of coating a lower layer in the first place by using any of gravure coating, roll coating, blade coating and extrusion coating apparatus, which are ordinarily used in the coating of a magnetic coating solution, and then coating an upper layer while the lower layer is still wet by means of a support-pressing type extrusion coating apparatus as disclosed in JP-B-1-46186, JP-A-60-238179 and JP-A-2-265672.

(2) A method of coating an upper layer and a lower layer almost simultaneously by using a coating head equipped with two slits for feeding coating solution as disclosed in JP-A-63-88080, JP-A-2-17971 and JP-A-2-265672.

(3) A method of coating an upper layer and a lower layer almost simultaneously by using an extrusion coating apparatus equipped with a backup roll as disclosed in JP-A-2-174965.

For preventing the deterioration of electromagnetic characteristics of a magnetic recording medium due to agglomeration of magnetic particles, it is preferred to give shear to the coating solution in a coating head by a method as disclosed in JP-A-62-95174 and JP-A-1-236968. With respect to the viscosity of a coating solution, the range of the numeric values disclosed in JP-A-3-8471 is necessary to be satisfied.

In the case of a disc-like magnetic recording medium, isotropic orientation can be sufficiently obtained in some cases without carrying out orientation by orientation apparatus, but it is preferred to use well-known random orientation apparatus, e.g., disposing cobalt magnets diagonally and alternately or applying an alternating current magnetic field with a solenoid. Hexagonal ferrites generally have an inclination of becoming three dimensional random orientation of in-plane and in the perpendicular direction but it can be made in-plane two dimensional random orientation. Further, it is also possible to provide isotropic magnetic characteristics in the circumferential direction by perpendicular orientation by using well-known methods such as the method of using different pole and counter position magnets. In particular, perpendicular orientation is preferred in the case of performing high density recording. Circumferential orientation may be performed by spin coating.

In the case of a tape-like magnetic recording medium, orientation is performed in the machine direction using a cobalt magnet and a solenoid. It is preferred to control the drying position of a coated film by controlling the temperature and the amount of drying air and coating velocity. Coating velocity is preferably from 20 to 1,000 m/min and the drying air temperature is preferably 60° C. or more. Appropriate preliminary drying can also be performed before entering a magnet zone.

Heat resisting plastic rollers such as epoxy, polyimide, polyamide and polyimideamide rollers, or metal rollers are used for calendering treatment. Metal rollers are preferably used for the treatment particularly when magnetic layers are coated on both surface sides of a support. Temperature for treatment is preferably 50° C. or more, and more preferably 100° C. or more. Linear pressure is preferably 196 kN/m (200 kg/cm) or more, and more preferably 294 kN/m (300 kg/cm) or more.

Physical Properties

In the case of a disc-like magnetic recording medium, the squareness ratio is generally from 0.55 to 0.67 in the case of two dimensional random orientation, preferably from 0.58 to 0.64, and the squareness ratio in the case of three dimensional random orientation is preferably from 0.45 to 0.55. In the case of perpendicular orientation, the squareness ratio is generally 0.6 or more and preferably 0.7 or more in the perpendicular direction, and when diamagnetic field correction is performed, the squareness ratio is generally 0.7 or more, and preferably 0.8 or more. The orientation ratio is preferably 0.8 or more in both two dimensional and three dimensional random orientation. In the case of two dimensional random orientation, the squareness ratio, Br and Hc in the perpendicular direction are preferably from 0.1 to 0.5 times those in the in-plane direction. In the case of a tape-like magnetic recording medium, the squareness ratio is 0.7 or more, and preferably 0.8 or more.

The friction coefficient of the magnetic recording medium of the present invention with a head in the range of the temperature of −10 to 40° C. and the humidity of from 0 to 95% is generally 0.5 or less, and preferably 0.3 or less. The specific resistance of magnetic surface is preferably from $10^4$ to $10^{12}$ Ω/sq, and the charge potential is preferably from −500 to +500 V. The elastic modulus at 0.5% elongation of a magnetic layer is preferably from 980 to 19,600 MPa (from 100 to 2,000 kg/mm$^2$) in every direction of in-plane, the breaking strength is preferably from 98 to 686 MPa (from 10 to 70 kg/mm$^2$), the elastic modulus of the magnetic recording medium is preferably from 980 to 14,700 MPa (from 100 to 1,500 kg/mm$^2$) in every direction of in-plane, the residual elongation is preferably 0.5% or less, and the thermal shrinkage factor at every temperature of 100° C. or less is preferably 1% or less, more preferably 0.5% or less, and most preferably 0.1% or less.

The glass transition temperature of a magnetic layer (the maximum of loss elastic modulus of dynamic viscoelasticity measurement measured at 110 Hz) is preferably from 80 to 120° C., and that of a nonmagnetic layer is preferably from 80 to 120° C. when a binder containing the polyurethane resin for use in the present invention is used in the nonmagnetic layer, and preferably from 70 to 90° C. when the binder is not used. The loss elastic modulus is preferably in the range of from $1 \times 10^5$ to $8 \times 10^8$ Pa, and the loss tangent is preferably 0.2 or less. When the loss tangent is too great, adhesion failure is liable to occur. These thermal and mechanical characteristics are preferably almost equal in every direction of in-plane of the medium with the difference of not more than 10%. The residual amount of the solvent in a magnetic layer is preferably 100 mg/m$^2$ or less, and more preferably 10 mg/m$^2$ or less. The void ratio of a coated layer is preferably 30% by volume or less with both of a nonmagnetic layer and a magnetic layer, and more preferably 20% by volume or less. The void ratio is preferably smaller for obtaining high output, but in some cases it is preferred to secure a specific value depending upon purposes. For example, in disc-like media repeatedly used, large void ratio contributes to good running durability in many cases.

The central plane average surface roughness (Ra) and the ten point average roughness (Rz) of the magnetic layer in the present invention are respectively preferably from 5 to 50 nm. It is also preferred for the magnetic layer to have a maximum height (Rmax) of 0.5 μm or less, a central plane peak height (Rp) of 0.3 μm or less, a central plane valley depth (Rv) of 0.3 μm or less, a central plane area factor (Sr) of from 20 to 80%, and an average wavelength (λa) of from 5 to 300 μm. It is preferred for the magnetic layer to have from 5 to 1,000 pimples of the surface of sizes of from 10 to 20 nm per 100 μm$^2$. The surface pimples can be easily controlled by the control of the surface property of the support by fillers, the particle size and the amount of the powder added to the magnetic layer, or by the surface configuration of the rollers of calender treatment. Curling is preferably within the range of ±3 mm. It is easily conceivable that these physical properties of the magnetic recording medium in the invention can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer to improve the touch of the magnetic recording medium with a head.

The needs for image-recording have increased more and more not only in the industrial fields but in general homes in the present multimedia society. The magnetic recording medium of the present invention has performances capable of sufficiently meeting the demands for the function and cost as the image-recording medium besides the data such as characters and figures.

The magnetic recording medium of the present invention can be preferably used for a magnetic recording and reproducing system using a magneto-resistance reproducing head (an MR head). The kind of the MR head is not particularly restricted, and a GMR head and a TMR head can also be used. A recording head for use in recording is not particularly limited, but it is preferred for a recording head to have saturation magnetization of 1.2 T or more, more preferably 2.0 T or more.

The magnetic recording medium in the present invention is preferably used for computer data recording.

EXAMPLES

The present invention is described with reference to specific examples below, but it should not be construed as the present invention is limited thereto. In the examples "parts" means "mass parts (weight parts)" unless otherwise indicated.

Example 1

Preparation of Coating Solution for Magnetic Layer

Magnetic Layer-forming Components:

| | |
|---|---|
| Ferromagnetic metal powder | 100 parts |
| Coercive force (Hc): 189.6 kA/m (2,400 Oe) | |
| Specific surface area by BET method: 75 m$^2$/g | |
| Crystallite size: 13 nm (130 Å) | |
| Saturation magnetization (σs): 120 A · m$^2$/kg (120 emu/g) | |
| Particle size (average long axis length): 45 nm | |
| Acicular ratio: 5.5 | |
| Composition: Fe/Co = 100/30 | |

-continued

| | |
|---|---|
| Surface-covering compounds: $Al_2O_3$, $Y_2O_3$ | |
| Vinyl chloride copolymer containing polar group (—$SO_3Na$ group) (MR-110 manufactured by Nippon Zeon Co., Ltd.) | 10 parts |
| Dimer diol polyurethane resin containing. polar group (—$SO_3Na$ group) (Tg: 160° C., content of —$SO_3Na$ group: $6 \times 10^{-5}$ eq/g) | 10 parts |
| α-Alumina (particle size: 0.1 μm) | 5 parts |
| Carbon black (particle size: 0.08 μm) | 0.5 parts |
| Butyl stearate | 1 part |
| Stearic acid | 2 parts |
| Methyl ethyl ketone | 90 parts |
| Cyclohexanone | 30 parts |
| Toluene | 60 parts |

Nonmagnetic Layer-forming Components

| | |
|---|---|
| Nonmagnetic powder: α-$Fe_2O_3$, hematite | 80 parts |
| Specific surface area by BET method: 110 $m^2/g$ | |
| Particle size (average long axis length): 0.15 nm | |
| pH: 9.3 | |
| Tap density: 0.98 g/ml | |
| Surface-covering compounds: $Al_2O_3$, $SiO_2$ | |
| Carbon black | 20 parts |
| Average primary particle size: 16 nm (16 mμ) | |
| DEP oil absorption: 80 ml/100 g | |
| pH: 8.0 | |
| Specific surface area by BET method: 250 $m^2/g$ | |
| Volatile content: 1.5% | |
| Vinyl chloride copolymer containing polar group (—$SO_3Na$ group, epoxy group) (MR-104, manufactured by Nippon Zeon Co., Ltd.) | 12 parts |
| Dimer diol polyurethane resin containing polar group (—$SO_3Na$ group) (Tg: 160° C., content of —$SO_3Na$ group: $6 \times 10^{-5}$ eq/g) | 10 parts |
| Butyl stearate | 1 part |
| Stearic acid | 2 parts |
| Methyl ethyl ketone | 100 parts |
| Cyclohexanone | 50 parts |
| Toluene | 50 parts |

The components for forming a magnetic layer and a nonmagnetic layer were respectively kneaded by an open kneader and dispersed with a sand mill. Forty (40) parts of methyl ethyl ketone was added to respective dispersion solutions, and each solution was filtered through a filter having an average pore diameter of 1 μm, thereby a non-magnetic layer-forming coating solution and a magnetic layer-forming coating solution were prepared.

Back Coat Layer-forming Components:

| | |
|---|---|
| Fine carbon black powder (furnace black, average particle size: 17 nm) | 100 parts |
| Coarse carbon black powder (furnace black, average particle size: 100 nm) | 30 parts |
| α-Alumina (hard inorganic powder) (average particle size: 100 nm, Mohs' hardness: 9) | 5 parts |
| Nitrocellulose resin | 140 parts |
| Polyurethane resin | 15 parts |
| Polyester resin | 5 parts |
| Methyl ethyl ketone | 1,200 parts |
| Butyl acetate | 300 parts |
| Toluene | 600 parts |

The components for forming a back coat layer were kneaded by a chilled roll and dispersed with a sand mill. Forty (40) parts of Coronate (manufactured by Nippon Polyurethane Industries Co., Ltd.) and 1,000 parts of methyl ethyl ketone were added to the dispersion solution, and the solution was filtered through a filter having an average pore diameter of 1 μm, thereby a back coat layer-forming coating solution was prepared.

Manufacture of Magnetic Tape

The compounds shown below were dissolved in 30 mass % of methyl ethyl ketone, and the solution was coated with a coil bar on a polyethylene naphthalate (PEN) support (thickness: 6 μm, Young's modulus in the machine direction (MD): 800 $kg/mm^2$, Young's modulus in the transverse direction (TD): 750 $kg/mm^2$, central line average surface roughness (Ra) of the side on which a magnetic layer was to be coated (cut-off value: 0.25 mm): 2 nm), dried, and the coated surface was irradiated with electron beams with accelerating voltage of 175 kV, beam current of 5 mA so that the absorbed dose became 5 Mrad, thereby an undercoat layer was formed.

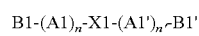  (1)

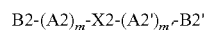  (2)

X1 is selected from the following group:

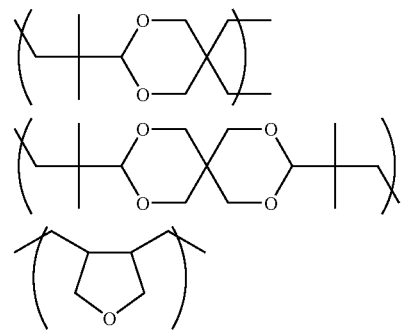

X2 is selected from the following group:

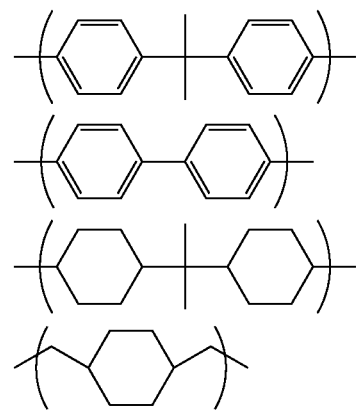

A1 and A2 each represents:

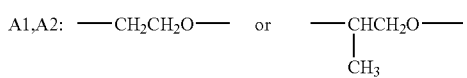

A1' and A2' each represents:

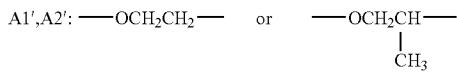

B1 and B2 each represents:

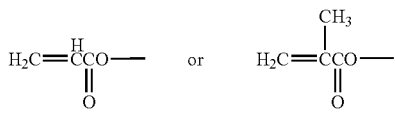

B1' and B2' each represents:

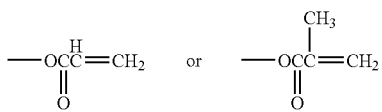

n and n' each represents any of from 0 to 4, and m and m' each represents any of from 1 to 4.

In the next place, the nonmagnetic layer-coating solution and the magnetic layer-coating solution were simultaneously multilayer-coated on the undercoat layer in this order. The nonmagnetic layer-coating solution was coated in a dry thickness of 1.5 µm and the magnetic layer-coating solution was coated in a dry thickness of 0.1 µm. The magnetic layer was subjected to orientation with a Co magnet having magnetic flux density of 0.3 T (3,000 Gauss) and a solenoid magnet having magnetic flux density of 0.15 T (1,500 Gauss) while the magnetic layer was still wet. By drying thereafter, a magnetic layer was formed.

The back coat layer-forming solution was coated on the other side of the support (the side opposite to the side on which the magnetic layer was formed) in a dry thickness of 0.5 µm, and the coated layer was dried to form a back coat layer. Thus the roll of a magnetic recording medium comprising a support having provided on one side a magnetic layer and a back coat layer on the other side was obtained.

The roll was passed through calendering machine of seven stages (temperature: 90° C., linear pressure: 300 kg/cm, velocity: 300 m/min) comprising a heating metal roller and an elastic roller of thermosetting resin covered around a core bar to thereby undergo calendering treatment, and wound up with a tension of 5 kg/m. The material of the heating metal roller is chromium-molybdenum steel plated with hard chromium having surface roughness (Ra) of 0.005 µm (cut-off value: 0.25 mm), and the thermosetting resin of the elastic roller is a product obtained by the reaction of processed bis(2-oxazoline) with aromatic diamine and an epoxy compound.

The roll was then slit to a width of ½ inch, and passed through a solenoid having magnetic flux density of 0.3 T (3,000 G), thereby demagnetized.

Example 2

A magnetic tape according to the present invention was manufactured in the same manner as in the manufacture of the magnetic tape in Example 1 except for using dimer diol polyurethane resin having Tg of 105° C. both in the magnetic layer and the nonmagnetic lower layer.

Example 3

A magnetic tape according to the present invention was manufactured in the same manner as in the manufacture of the magnetic tape in Example 1 except for using dimer diol polyurethane resin having Tg of 195° C. both in the magnetic layer and the nonmagnetic lower layer.

Example 4

A magnetic tape according to the present invention was manufactured in the same manner as in the manufacture of the magnetic tape in Example 1 except for changing the thickness of the magnetic layer to 30 nm.

Example 5

A magnetic tape according to the present invention was manufactured in the same manner as in the manufacture of the magnetic tape in Example 1 except for using the magnetic powder shown below.

Ferromagnetic Metal Powder

Coercive force (Hc): 189.6 kA/m (2,400 Oe)
Specific surface area by BET method: 70 m$^2$/g
Crystallite size: 130 Å
Saturation magnetization ($\sigma$s): 120 A·m$^2$/kg
 (120 emu/g)
Particle size (average long axis length): 60 nm
Acicular ratio: 6
Fe/Co=100/30
Surface-covering compounds: Al$_2$O$_3$ and Y$_2$O$_3$ Example 6

A magnetic tape according to the present invention was manufactured in the same manner as in the manufacture of the magnetic tape in Example 1 except for changing the thickness of the magnetic layer to 145 nm.

Comparative Example 1

A magnetic tape according to the present invention was manufactured in the same manner as in the manufacture of the magnetic tape in Example 1 except that dimer diol polyurethane resin having Tg of 90° C. shown below was used both in the magnetic layer and the nonmagnetic lower layer.

Polyester Polyurethane Resin Containing a Polar Group (—SO$_3$Na group)
(neopentyl glycol/caprolactane polyol/MDI=0.9/2.6/1 (by weight), the content of —SO$_3$Na group: 1×10$^{-4}$ mol/g)

Comparative Example 2

A magnetic tape according to the present invention was manufactured in the same manner as in the manufacture of the magnetic tape in Example 1 except for using polyurethane resin having Tg of 205° C. both in the magnetic layer and the nonmagnetic lower layer.

Comparative Example 3

A magnetic tape according to the present invention was manufactured in the same manner as in the manufacture of the magnetic tape in Example 1 except for changing the thickness of the magnetic layer to 160 nm.

Comparative Example 4

A magnetic tape according to the present invention was manufactured in the same manner as in the manufacture of the magnetic tape in Example 1 except for using the magnetic powder shown below.

Ferromagnetic Metal Powder

Coercive force (Hc): 189.6 kA/m (2,400 Oe)
Specific surface area by BET method: 65 $m^2/g$
Crystallite size: 130 Å
Saturation magnetization ($\sigma s$): 125 $A \cdot m^2/kg$
  (125 emu/g)
Particle size (average long axis length): 100 nm
Acicular ratio: 6.5
Fe/Co=100/30
  Surface-covering compounds: $Al_3O_3$ and $Y_2O_3$

Comparative Example 5

A magnetic tape according to the present invention was manufactured in the same manner as in the manufacture of the magnetic tape in Example 1 except for coating the magnetic layer coating solution and the nonmagnetic layer coating solution on the support without coating the undercoat layer coating solution.

Comparative Example 6

A magnetic tape according to the present invention was manufactured in the same manner as in the manufacture of the magnetic tape in Example 1 except for changing the thickness of the undercoat layer to 1.5 μm.

Methods of Evaluation

<Tg of Polyurethane>

Measurement was performed with a dynamic viscoelasticity measuring instrument Rheovibron (manufactured by A&D Co., Ltd.) at frequency of 110 Hz and temperature-up velocity of 2° C./min, and Tg was obtained from the peak temperature of loss elastic modulus.

<Particle Size of Ferromagnetic Powder>

A TEM photograph of a ferromagnetic particle was taken. The average particle size was obtained from the photograph by the method of directly reading the short axis length and the long axis length of the ferromagnetic powder, and the method of reading the short axis length and the long axis length by tracing the TEM photograph with an image analyzer IBASSI (manufactured by Carl-Zeiss) arbitrarily in combination.

<Central Line Average Surface Roughness>

The central line average surface roughness (Ra) of the area of about 250 μm×250 μm of the surface of a medium was measured with TOPO-3D (a product of WYKO Co.) by MIRAU method. The wavelength of measurement was about 650 nm and spherical compensation and cylindrical compensation were applied. The measurement was performed with a light interference type non-contact surface roughness meter.

<Running Durability>

After a magnetic layer surface was reciprocating slid 20,000 times against the recording/reproducing heads of DLT4 drive at 40° C. 80% RH, the amount of the soil on the head was evaluated by five grades. The length of the tape was 20 m, running tension was 100 gr, and running speed was 3 m/sec.

5: The heads were free of soil.
4: The heads were soiled but not the slid face with the tape.
3: The slid faces of the heads with the tape were soiled.
2: The vicinity of the head gap was soiled.
1: The head gap area was covered with the soil.

<PW 50 Measuring Method>

An original running system of running a tape between two reels was assembled, and accurate running was contrived by building a tape guide between two reels. Servo-light running was not performed.

An SAL type merging head was adopted, which was equipped with an MR sensor having a track width of 25 μm and a gap width of 0.3 μm as the recording head, and a track width of 12 μm, where the shield distance was modified, as the reproducing head. PW 50 of solitary wave (the half value width of solitary wave) was measured by recording and reproducing 100 KHz of rectangular wave by setting optimal recording current at 150 kfci.

Running speed was 2.55 m/sec.

<Measuring Method of SNR>

SNR of Magnetic Tape:

DLT7000 drive was modified and a recording head (MIG, gap: 0.15 μm, 1.8 T) and an MR head for reproduction (optimal Br·t: 0.035 T·μm) were built in. These heads are fixed heads.

SNR was obtained from the reproduction output at linear recording density of 100 kFCI and noise (the signal factor at the frequency 1 MHz apart from the carrier frequency). The reproduction output and the SNR were the relative evaluations with the magnetic tape in Comparative Example 2 as the standard.

TABLE 1

|  | Undercoat Layer Thickness (μm) | Tg of Urethane in Binder (° C.) | Thickness of Magnetic Layer (nm) | Long Axis Length of Magnetic Powder (nm) | Ra of Magnetic Layer (nm) | SNR (dB) | PW 50 (nm) | Running Durability |
|---|---|---|---|---|---|---|---|---|
| Example 1 | 0.5 | 160 | 100 | 45 | 2.0 | 6.0 | 190 | 5 |
| Example 2 | 0.5 | 105 | 100 | 45 | 1.8 | 6.5 | 190 | 4 |
| Example 3 | 0.5 | 195 | 100 | 45 | 2.6 | 4.8 | 190 | 5 |
| Example 4 | 0.5 | 160 | 30 | 45 | 1.6 | 1.6 | 100 | 4 |
| Example 5 | 0.5 | 160 | 100 | 60 | 2.2 | 2.2 | 260 | 5 |
| Example 6 | 0.5 | 160 | 145 | 45 | 2.0 | 2.0 | 300 | 5 |
| Comparative Example 1 | 0.5 | 90 | 100 | 45 | 1.7 | 1.7 | 190 | 1 |
| Comparative Example 2 | 0.5 | 205 | 100 | 45 | 3.5 | 3.5 | 190 | 5 |
| Comparative Example 3 | 0.5 | 160 | 160 | 45 | 2.8 | 2.8 | 420 | 5 |
| Comparative Example 4 | 0.5 | 160 | 100 | 100 | 2.8 | 2.8 | 260 | 5 |
| Comparative Example 5 | 0 | 160 | 100 | 45 | 4.3 | 4.3 | 290 | 5 |
| Comparative Example 6 | 1.5 | 160 | 100 | 45 | 1.4 | 1.4 | 190 | 2 |

As can be seen from the results in Table 1, magnetic recording media in which Tg of the polyurethane resin used in the magnetic layer is from 100 to 200° C., the average long axis length of the ferromagnetic metal powder is from 20 to 60 nm, the thickness of the magnetic layer is from 20 to 150 μm, and the thickness of the undercoat layer containing a compound polymerizable by radiation exposure is from 0.1 to 1 μm show good SNR and PW 50 and excellent running durability.

Contrary to this, in the case where Tg of the polyurethane resin is less than 100° C. and the thickness of the undercoat layer is greater than 1 μm, running durability deteriorates (Comparative Examples 1 and 5). Further, when the thickness of the magnetic layer is thicker than 150 nm, SNR lowers and PW 50 becomes great (Comparative Example 2). In addition, when the average long axis length of the ferromagnetic metal powder is more than 60 nm or the thickness of the undercoat layer is less than 0.1 μm, SNR decreases (Comparative Examples 3 and 4).

From the above results, it can be seen that more stable durability as compared with conventional magnetic recording media can be obtained by increasing Tg of the binder (polyurethane resin) used in a magnetic layer, and high SNR and low PW 50 can be obtained and the error rate stabilization can be secured by making the average long axis length (average tabular diameter) of the ferromagnetic powder to be used smaller, thinning the thickness of a magnetic layer, and making the thickness of an undercoat layer from 0.1 to 1 μm.

As has been described, the magnetic recording medium of the present invention comprises a nonmagnetic support having provided thereon an undercoat layer containing a compound polymerizable by radiation exposure, and a magnetic layer on the undercoat layer, wherein the thickness of the undercoat layer is from 0.1 to 1 μm, the polyurethane resin contained in the magnetic layer has a glass transition temperature of from 100 to 200° C., the thickness of the magnetic layer is from 20 to 150 nm, and the average particle size of the ferromagnetic powder is from 20 to 60 nm. By this constitution, the present invention can provide a magnetic recording medium capable of realizing the compatibility of a stable error rate and running durability in high density recording inexpensively.

This application is based on Japanese Patent application JP 2003-80223, filed Mar. 24, 2003, the entire content of which is hereby incorporated by reference, the same as if set forth at length.

What is claimed is:

1. A magnetic recording medium comprising:
   a nonmagnetic support;
   an undercoat layer containing a compound polymerizable by radiation exposure; and
   a magnetic layer containing ferromagnetic powder and a binder, in this order
   wherein the undercoat layer has a thickness of from 0.1 to 1 μm, the binder contains a polyurethane resin having a glass transition temperature of from 100 to 200° C., the magnetic layer has a thickness of from 20 to 150 nm, and an average particle size of the ferromagnetic powder is from 20 to 60 nm.

2. The magnetic recording medium according to claim 1, wherein the undercoat layer has a thickness of from 0.3 to 0.8 μm.

3. The magnetic recording medium according to claim 1, wherein the binder contains a polyurethane resin having a glass transition temperature of from 120 to 170° C.

4. The magnetic recording medium according to claim 1, wherein the magnetic layer has a thickness of from 20 to 100 nm.

5. The magnetic recording medium according to claim 1, wherein the magnetic layer has a thickness of from 20 to 50 nm.

6. The magnetic recording medium according to claim 1, wherein an average particle size of the ferromagnetic powder is from 20 to 50 nm.

7. The magnetic recording medium according to claim 1, wherein an average particle size of the ferromagnetic powder is from 20 to 45 nm.

8. The magnetic recording medium according to claim 1, further comprising a nonmagnetic layer containing nonmagnetic inorganic powder and a binder so that the nonmagnetic support, the undercoat layer, the nonmagnetic layer and the magnetic layer are in this order.

9. The magnetic recording medium according to claim 8, wherein the nonmagnetic layer has a thickness of from 1.0 to 3.0 µm.

10. The magnetic recording medium according to claim 8, wherein the nonmagnetic layer has a thickness of from 1.0 to 2.5 µm.

11. The magnetic recording medium according to claim 8, wherein the nonmagnetic layer has a thickness of from 1.0 to 1.5 µm.

12. The magnetic recording medium according to claim 1, further comprising a back coat layer containing a carbon black and inorganic powder so that the back coat layer, the nonmagnetic support, the undercoat layer and the magnetic layer are in this order.

13. The magnetic recording medium according to claim 12, wherein the back coat layer has a thickness of from 0.2 to 1.0 µm.

14. The magnetic recording medium according to claim 12, wherein the back coat layer has a thickness of from 0.3 to 0.7 µm.

15. The magnetic recording medium according to claim 1, the compound polymerizable by radiation exposure is: a compound having a cyclic ether skeleton and two or more radiation-curable functional groups in a molecule; or a compound having a cyclic structure and an ether group and having two or more radiation-curable functional groups in a molecule.

* * * * *